United States Patent
Ohta et al.

[11] Patent Number: 6,115,252
[45] Date of Patent: Sep. 5, 2000

[54] HEAT SINK DEVICE FOR ELECTRONIC DEVICES

[75] Inventors: Keiichiro Ohta; Yuichi Furukawa, both of Tochigi, Japan

[73] Assignee: Showa Aluminum Corporation, Sakai, Japan

[21] Appl. No.: 09/343,459

[22] Filed: Jun. 30, 1999

[30] Foreign Application Priority Data

| Jul. 1, 1998 | [JP] | Japan | 10-186063 |
| Jul. 2, 1998 | [JP] | Japan | 10-187631 |
| Jul. 2, 1998 | [JP] | Japan | 10-187636 |
| Jul. 2, 1998 | [JP] | Japan | 10-187641 |

[51] Int. Cl.[7] ............................................ H05K 7/20
[52] U.S. Cl. .................. 361/700; 361/687; 361/688; 361/689; 361/690; 361/694; 361/695; 361/698; 361/699; 257/714; 257/715; 174/15.1; 174/15.2; 174/16.1; 165/80.4
[58] Field of Search ........................ 361/689, 690, 361/694, 695–700, 701–704, 719; 257/714, 715; 174/15.1, 15.2, 16.1; 165/80.3, 80.4, 104.33, 104.34

[56] References Cited

U.S. PATENT DOCUMENTS

| 4,044,396 | 8/1977 | Haws et al. | 361/698 |
| 4,830,100 | 5/1989 | Kato et al. | 165/104.14 |
| 5,179,500 | 1/1993 | Koubek et al. | 361/700 |
| 5,339,214 | 8/1994 | Nelson | 361/695 |
| 5,409,055 | 4/1995 | Tanaka et al. | 165/104.33 |
| 5,472,043 | 12/1995 | Larson et al. | 165/104.21 |
| 5,510,958 | 4/1996 | Shimabara et al. | 361/719 |
| 5,513,070 | 4/1996 | Xie et al. | 361/700 |
| 5,729,995 | 3/1998 | Tajima | 165/104.33 |
| 5,917,699 | 6/1999 | Hung et al. | 361/697 |
| 5,949,648 | 9/1999 | Liao | 361/700 |
| 5,959,837 | 9/1999 | Yu | 361/697 |
| 5,966,286 | 10/1999 | O'Connor et al. | 361/699 |

FOREIGN PATENT DOCUMENTS

99/06903  2/1999  WIPO .

OTHER PUBLICATIONS

"Integrated heat pipe fan" IBM Technical Disclosure Bulletin., vol. 38, No. 12, Dec. 1995 (1995–12), pp. 531–532, XP000588228 IBM Corp. New York., US ISSN: 0018–8689.

*Primary Examiner*—Gerald Tolin
*Assistant Examiner*—Boris L. Chervinsky
*Attorney, Agent, or Firm*—Armstrong, Westerman, Hattori, McLeland & Naughton

[57] ABSTRACT

A heat sink device for use in an electronic device for dissipating into the atmosphere outside a housing of the electronic device the heat generated by an electronic component disposed within the housing. The housing has a peripheral wall formed with a heat removal opening. A heat sink disposed within the housing comprises a metal body having a heat pipe portion, and a radiation fin attached to the body in the vicinity of the heat removal opening and opposed to the opening. The heat-generating electronic component, such as CPU, is held in contact with the metal body at a location away from the fin attached portion thereof.

17 Claims, 22 Drawing Sheets

HEAT SINK DEVICE FOR ELECTRONIC DEVICES

BACKGROUND OF THE INVENTION

The present invention relates to heat sink devices for use in electronic devices, preferably in portable electronic devices, wherein electronic components comprising a semiconductor device or the like are arranged within a housing, for dissipating the heat generated by the electronic components to outside the housing.

With portable electronic devices such as notebook personal computers, laptop personal computers and other portable computer devices, the central processing unit (CPU) and other electronic components comprising a semiconductor device generate heat, which needs to be dissipated to outside the housing.

For example, notebook personal computers generally comprise a thin housing having a keyboard, and a display unit free to open and close relative to the housing. Disposed inside the housing is a printed circuit board having a CPU mounted thereon.

The present applicant has already proposed a heat sink device for the CPU of the notebook personal computer described (see JP-A No. 122774/1998). The device comprises a horizontal metal base plate formed by two metal sheets bonded to each other under pressure and having a hollow portion formed between the two metal sheets, a working liquid being enclosed in the hollow portion to provide a heat pipe portion. The metal base plate is disposed within the housing, and the heat pipe portion has a heat receiving part for receiving the heat generated by the electronic component.

Such a heat sink device is so designed that the CPU or like heat-generating electronic component is held in contact with the heat receiving part of the heat pipe portion. The heat generated by the electronic component is transferred to the heat receiving part of the heat pipe portion, and the working liquid collecting in the heat receiving part of the heat pipe portion evaporates by being heated with the heat. The working liquid in the form of a gas thus produced flows through the heat pipe portion away from the heat receiving part, dissipating heat into the air inside the housing through the metal base plate. The heat given to the heated air within the housing is dissipated to outside the housing through the keyboard.

Remarkable progress has recently been made in the field of portable electronic devices to provide devices having an increased number of functions and adapted to a higher processing speed, with the result that CPUs and like semiconductor devices of increased output are in use which generate a greatly increased quantity of heat. The conventional heat sink devices are therefore no longer fully efficient in dissipating the heat to outside the housing.

SUMMARY OF THE INVENTION

An object of the present invention is to overcome the above problem and to provide a heat sink device for use in electronic devices which is much superior to the conventional heat sink device in its efficiency in dissipating heat to outside the housing.

Other objects of the invention will become apparent from the following description.

The present invention provides a heat sink device for use in an electronic device for dissipating into the atmosphere outside a housing of the electronic device the heat generated by an electronic component disposed within the housing, the housing having a peripheral wall formed with a heat removal opening, a heat sink being disposed within the housing, the heat sink comprising a body having a heat pipe portion, and a radiation fin attached to the body in the vicinity of the heat removal opening and opposed to the opening.

With the heat sink device thus constructed, the CPU or like heat-generating electronic component is held in contact with the body of the heat sink at a location away from the portion thereof where the radiation fin is provided. The heat generated by the electronic component is transferred to the heat pipe portion of the body, then heats a working liquid collecting in the heat receiving part of the heat pipe portion which part is given the heat. The working liquid therefore evaporates to a gas. The gaseous liquid produced flows through the heat pipe portion to move away from the heat receiving part, dissipating heat into the air inside the housing through the body and the radiation fin to become liquefied again. The heat as given to the heated air within the housing is dissipated into the air outside the housing through a keyboard. Accordingly, the area of heat transfer to the air inside the housing increases by an amount corresponding to the radiation fin. Moreover, the radiation fin, which is positioned as opposed to the heat removal opening, radiates heat directly to outside the housing through the opening. Consequently the portion where the radiation fin is provided achieves a higher heat dissipation efficiency than the other portion. The liquefied working liquid returns to the heat receiving part. The portion of the working liquid originally remaining in the heat pipe portion in the region thereof other than the heat receiving part flows into the heat receiving part. Through repetitions of such movements, the heat generated by the electronic component is dissipated. Accordingly the present device exhibits higher radiation performance than the conventional heat sink device described which dissipates heat only into the air inside the housing and further radiates the heat into the air outside the housing through the keyboard.

The present invention provides another heat sink device for use in an electronic device for dissipating into the atmosphere outside a housing of the electronic device the heat generated by an electronic component disposed within the housing, the housing having a peripheral wall formed with an air inlet and an air outlet, a heat sink being disposed within the housing, the heat sink comprising a body in the form of a metal plate and having a heat pipe portion, the body being formed with a hole in a portion thereof other than the heat pipe portion.

With the heat sink device thus constructed, the CPU or like heat-generating electronic component is held in contact with the heat pipe portion of the body. The heat generated by the electronic component is transferred to the heat pipe portion, then heats a working liquid collecting in the heat receiving part of the heat pipe portion which part is given the heat. The working liquid therefore evaporates to a gas. The gaseous liquid produced flows through the heat pipe portion to move away from the heat receiving part, dissipating heat into the air inside the housing through the body to become liquefied again. When the gaseous working liquid dissipates heat into the air inside the housing, heating the inside air, the air within the housing undergoes natural convection, producing a flow along the surface of the body, with the result that the heated air at least partly flows out of the housing through the air outlet while permitting air to flow into the housing from outside. Moreover, the air flowing inside the housing passes through the hole to flow along opposite surface of the body, consequently permitting the body to radiates heat efficiently. The liquefied working liquid returns to the heat receiving part. The portion of the working liquid originally remaining in the heat pipe portion in the region thereof other than the heat receiving part flows into the heat receiving part. Through repetitions of such movements, the heat generated by the electronic component is dissipated. Accordingly the present device exhibits higher radiation performance than the conventional heat sink device described which dissipates heat only into the air inside the housing and further radiates the heat into the air outside the housing through the keyboard.

DESCRIPTION OF THE PREFERRED EMBODIMENTS

Figure 1:
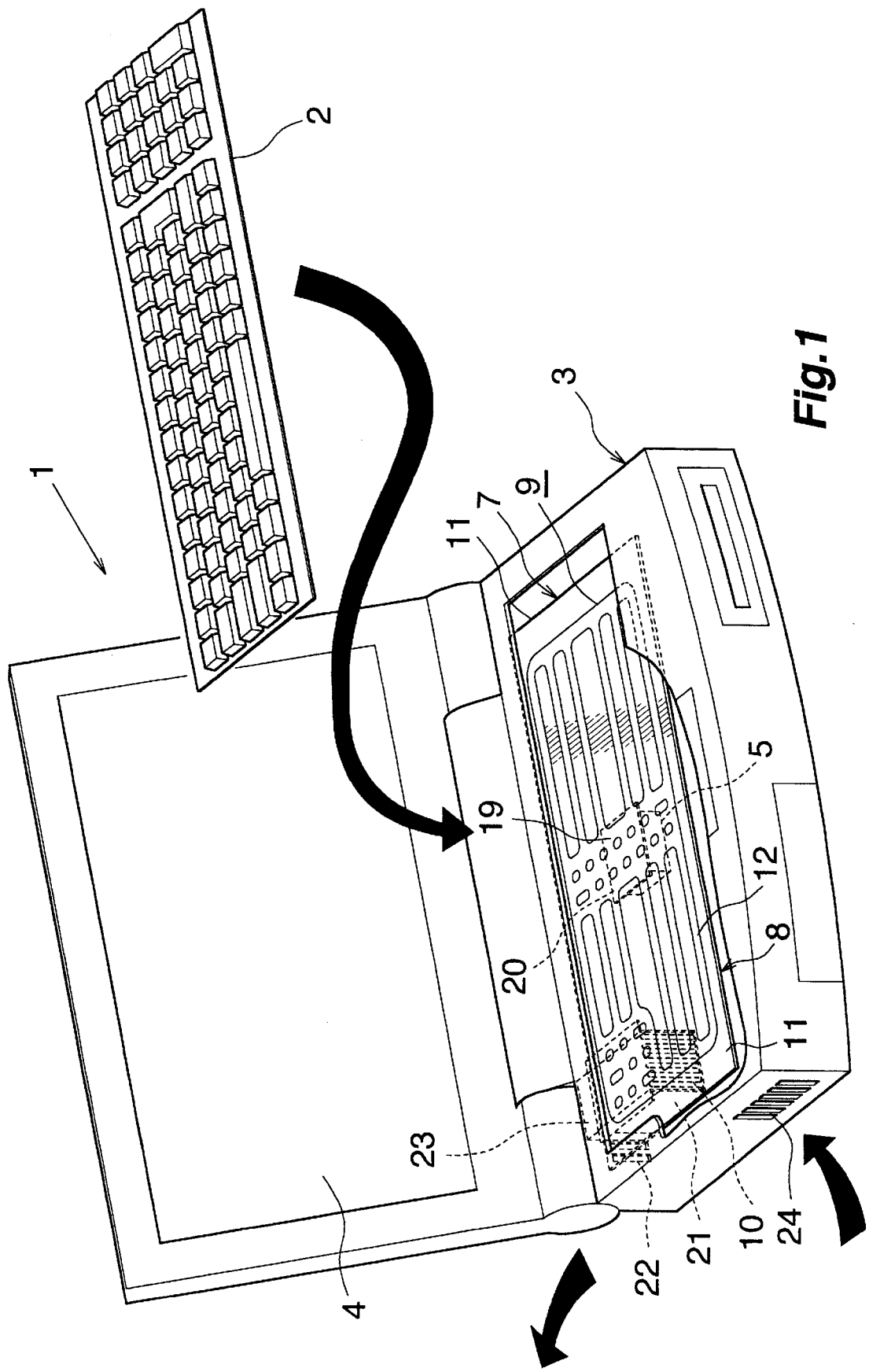
FIG. 1 is a perspective view schematically showing a notebook personal computer equipped with a first embodiment of heat sink device of the invention.

Throughout all the drawings, like parts are referred to by like reference numerals and will not be described repeatedly.

In the following description, the left-hand side and right-hand side of FIGS. 2, 7, 15 and 22 will be referred to respectively as "left" and "right," the lower side of these drawings as "front" and the opposite side thereof as "rear." Further the term "aluminum" as used in the following description includes pure aluminum and aluminum alloys.

Figure 2:
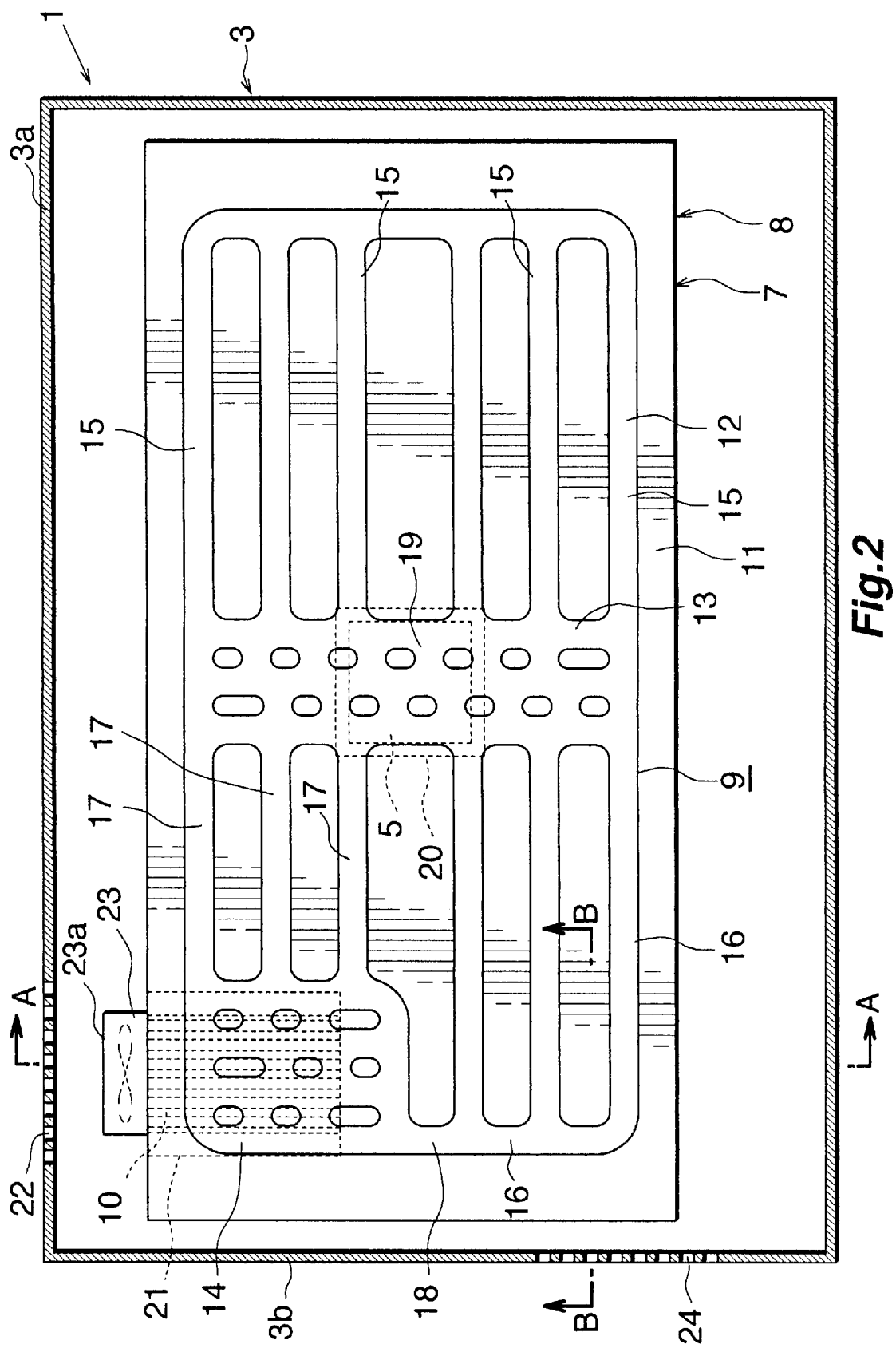
FIG. 2 is a view in horizontal section schematically showing the notebook personal computer equipped with the first embodiment of heat sink device of the invention.
Figure 3:
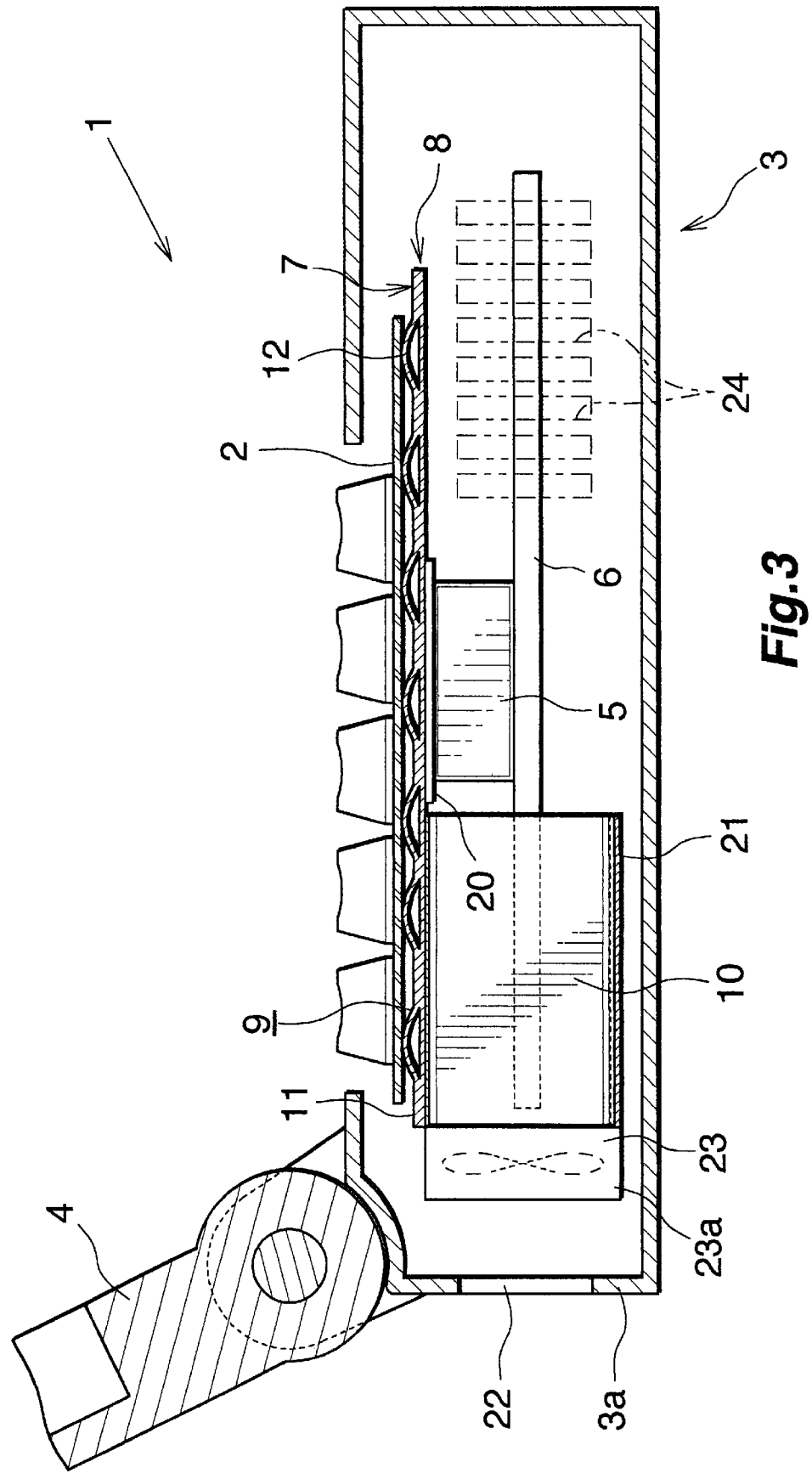
FIG. 3 is an enlarged view in section taken along the line A—A in FIG. 2.
Figure 4:
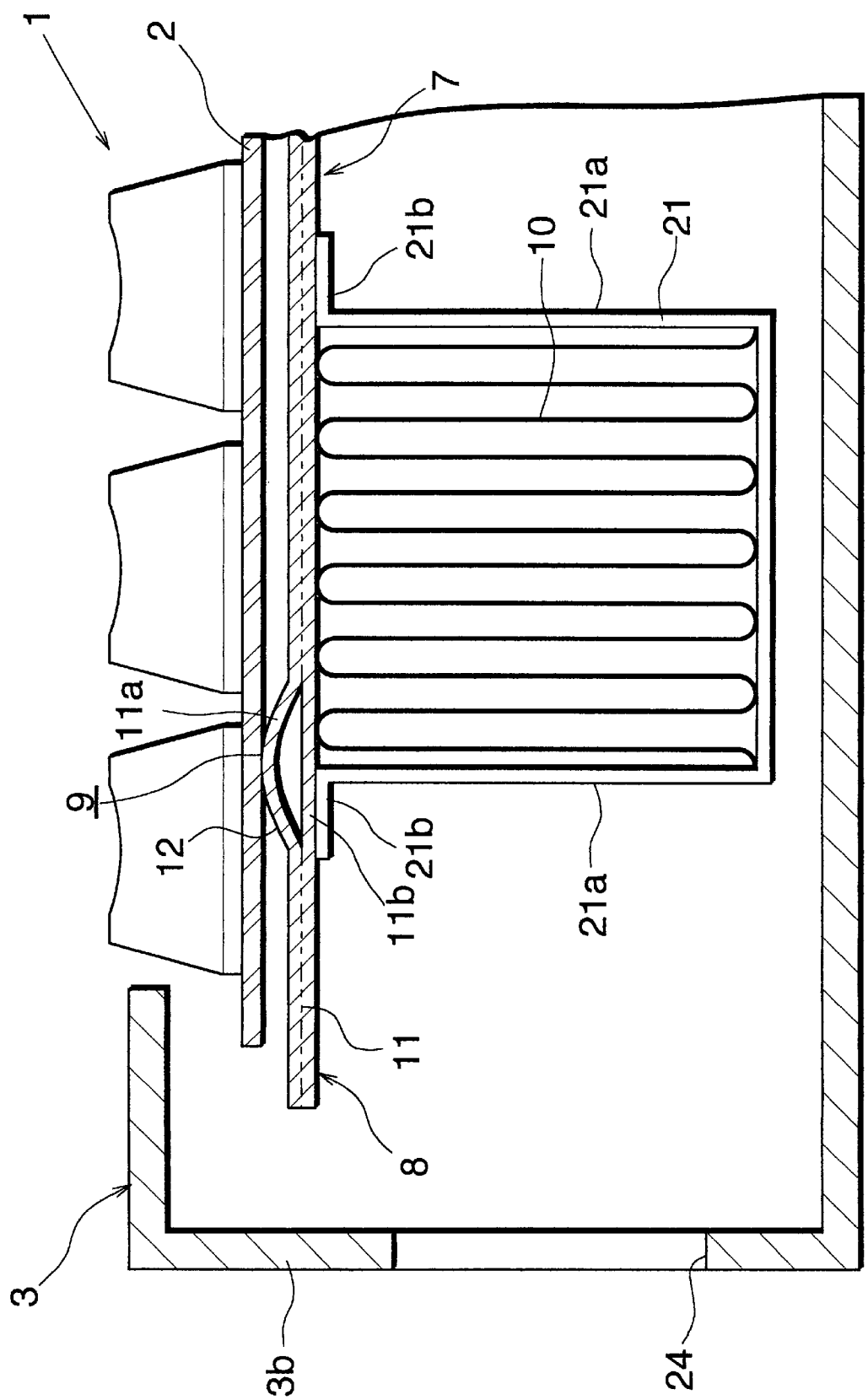
FIG. 4 is an enlarged view in section taken along the line B—B in FIG. 2.

FIGS. 1 to 3 show the overall construction of a notebook personal computer comprising a first embodiment of heat sink device of the invention. FIG. 4 shows part of the computer on an enlarged scale.

With reference to FIGS. 1 to 3, the notebook personal computer 1 comprises a thin housing 3 having a keyboard 2, and a display unit 4 free to open and close relative to the housing 3. Disposed within the housing 3 is a printed circuit board 6 having a CPU 5 mounted thereon.

A heat sink 7 is disposed inside the housing 3. The heat sink 7 comprises a body 8 having a heat pipe portion 9, and a radiation fin 10 attached to the body 8. The body 8 comprises a horizontal aluminum base plate 11 which is formed of upper and lower two aluminum sheets 11a, 11b bonded to each other under pressure (see FIG. 4) and which is provided inside the housing 3 between the keyboard 2 and the circuit board 6. An upwardly bulged hollow portion 12 is formed in a required pattern between the two aluminum sheets 11a, 11b forming the base plate 11, and a working liquid (not shown) is enclosed in the hollow portion 12 to provide the heat pipe portion 9. The aluminum base plate 11 is in the form of a rectangle elongated leftward or rightward (longitudinally of the computer), has approximately the same size as the keyboard 2 and is disposed in contact with the keyboard 2 or spaced apart from the keyboard 2 by a very small clearance. The working liquid comprises, for example, PFC, HFC134a, CFC113 or HCFC123 and is enclosed in the hollow portion 12 in an amount of about 5 to 75%, preferably about 40 to about 50%, of the content volume of the portion 12. The working liquid is enclosed in the hollow portion 12 which has an open end at a peripheral edge portion of the aluminum base plate 11, by injecting the liquid through the open end, thereafter collapsing the upper aluminum sheet 11a flat at the open end region and bonding the sheet 11a to the lower aluminum sheet 11b under pressure.

The upper aluminum sheet 11a is made, for example, from JIS A1230, and the lower aluminum sheet 11b is made, for example, from a material prepared by adding Zr to JIS A1230. The aluminum base plate 11 is prepared by the so-called roll bonding process because this process has the advantages, for example, of forming a complex circuit having the hollow portion 12, giving a leakage-free product, being highly amenable to mass production and having greater freedom with respect to the size and configuration of the product. With this process, a parting agent is printed in a required pattern on at least one of the opposed surfaces of two aluminum sheets 11a, 11b to be joined, the sheets 11a, 11b are then bonded in this state under pressure to obtain a clad plate having a nonbonded portion, and a pressure fluid is introduced into the nonbonded portion of the clad plate to form the hollow portion 12 at a time. The parting agent to be used is, for example, an ink consisting mainly of colloidal graphite up to 1 micrometer in particle size. However, the process for producing the aluminum base plate 11 is not limited to roll bonding.

As shown in FIG. 2, the heat pipe portion 9 comprises a first latticelike part 13 formed at the midportion of length of the base plate 11 and in the form of a rectangle which is elongated transversely of the base plate 11 and has a length approximately equal to the entire width of the base plate 11; a second latticelike part 14 formed at the left end portion of the base plate 11 toward the rear edge thereof and in the form of a rectangle which is elongated transversely of the base plate 11 and has a length approximately equal to one-half of the width of the base plate 11; five rectangular loop parts 15 provided at the right of the first latticelike part 13, elongated longitudinally of the base plate 11 and communicating at their opposite ends with the part 13; two loop parts 16 provided at the left of the first latticelike part 13 and in front of the second latticelike part 14, elongated longitudinally of the base plate 11 and communicating at their opposite ends with the part 13; three straight parts 17 elongated longitudinally of the base plate 11 and holding the first and second latticelike parts 13, 14 in communication with each other; and a short straight part 18 elongated transversely of the base plate 11 and causing the second latticelike part 14 to communicate with the rear of the two loop parts 16 therethrough. Each pair of adjacent loop parts 15 or 16 have a longitudinally extending straight portion in common. When seen collectively, the combination of loop parts 15 at the right of the first latticelike part 13 has a generally square contour, and the combination of loop parts 16 at the left of the first latticelike part 13 has a rectangular contour. The midportion of length of the first latticelike part 13 provides a heat receiving part 19 for receiving the heat generated by the CPU 5. The heat receiving part 19 of the heat pipe portion 9 has an aluminum sheet 20 attached to the bottom surface of the aluminum base plate 11 with an elastomer of high thermal conductivity (not shown) provided therebetween.

The radiation fin 10, which is in the form of an aluminum corrugated fin, is attached to the bottom surface of the aluminum base plate 11 over an area thereof extending from the front end of second latticelike part 14 of the heat pipe portion 9 to the rear edge of the base plate 11. As shown in FIG. 4, the radiation fin 10 is positioned with the crests and furrows thereof extending transversely of the base plate 11, has its crests held in contact with the base plate bottom surface by the elastomer of high thermal conductivity (not shown) and is attached to the base plate 11 by an aluminum cover 21 secured to the base plate 11. The crests of the fin 10 may be brazed to the bottom surface of the base plate 11. The cover 21 is generally U-shaped when seen from the front and has its front and rear ends left open. The cover 21 has pair of left and right vertical walls 21a integrally formed at their upper ends with respective bent portions 21b extending leftward and rightward outwardly of the cover 21. The bent portions 21b are bonded to the base plate bottom surface with an adhesive or by welding or brazing. The cover 21 may be fixed to the base plate 11 mechanically. A corrugated fin having louvers may be used as the radiation fin 10. Another fin of different type may be used as the fin 10 in place of the corrugated fin.

The housing 3 of the computer 1 has a rear wall 3a which is formed with a heat removal opening 22 in a left end portion thereof. The radiation fin 10 has its rear end opposed to the opening 22. Disposed inside the housing 3 between the heat removal opening 22 and the fin 10 is an axial-flow fan 23 attached to the base plate 11 and the cover 21 and having an axis of rotation extending transversely of the housing. The fan 23 has a casing 23a formed with an intake opening which is in communication with the interior of the cover 21. The housing 3 has a left side wall 3b formed with an air inlet 24 in a front end portion thereof. The air within the housing 3 is passed through the radiation fin 10 and then sent out of the housing 3 through the heat removal opening 22 by the fan 23, which also serves to introduce the outside air into the housing 3 through the air inlet 24. The blower for discharging the air from inside the housing 3 through the opening 22 after passage through the fin 10 and taking the outside air into the housing 3 through the inlet 24 is not limited to the axial-flow fan but can be a fan of different type.

In the notebook personal computer 1 described, the CPU 5 mounted on the upper surface of the circuit board 6 is in intimate contact with the aluminum sheet 20 beneath the aluminum base plate 11. The heat generated by the CPU 5 is transferred to the working liquid in the heat receiving part 19 of the heat pipe portion 9 through the aluminum sheet 20, elastomer of high thermal conductivity and lower aluminum sheet 11b of the base plate 11. The working liquid heated with the heat evaporates to a gas in this part 19. The gaseous working liquid flows into the loop parts 15, 16 of the heat pipe portion 9 to move away from the heat receiving part 19, dissipating heat into the air outside the housing 3 through the upper aluminum sheet 11a and the keyboard 2 and also dissipating heat into the air within the housing 3 through the aluminum base plate 11 to become liquefied again. The liquefied working liquid circulates through the loop parts 15, 16 or reversely flows and returns to the heat receiving part 19. The gas of working liquid produced in the heat receiving part 19 flows through the straight parts 17 or through the short straight part 18 via the loop parts 16 and further flows into the second latticelike part 14. Before flowing into the second latticelike part 14, a portion of the gas also dissipates heat into the air outside the housing 3 through the upper aluminum sheet 11a and the keyboard 2 while dissipating heat also to the air inside the housing 3 through the base plate 11 to become partly liquefied again. The gaseous working liquid flowing into the second latticelike part 14 radiates heat into the air outside the housing 3 through the upper aluminum sheet 11a and the keyboard 2, also dissipates heat into the air within the housing 3 through the aluminum base plate 11 and the radiation fin 10 and is liquefied again. The liquefied working liquid returns to the heat receiving part 19. The portion of working liquid originally remaining in the part of the heat pipe portion 9 other than the heat receiving part 19 flows into this part 19. Through repetitions of such movements, the heat generated by the CPU 5 is radiated into the air inside the housing 3. The fan 23 is held in operation at this time to discharge the heated air from inside the housing 3 via the heat removal opening 22 while causing the air outside the housing 3 to flow into the housing 3 through the air inlet 24. This precludes the heat from being confined in the housing 3, further causing the air having a lower temperature and taken into the housing 3 from outside to pass through the radiation fin 10 for the fin 10 to achieve an improved heat dissipation efficiency.

The aluminum base plate 11 of the first embodiment described comprises upper and lower two aluminum sheets 11a, 11b, whereas the base plate may comprise at least three aluminum sheets. The hollow portion having the working liquid enclosed therein, although so shaped as to bulge upward, may alternatively bulge downward.

Figure 5:
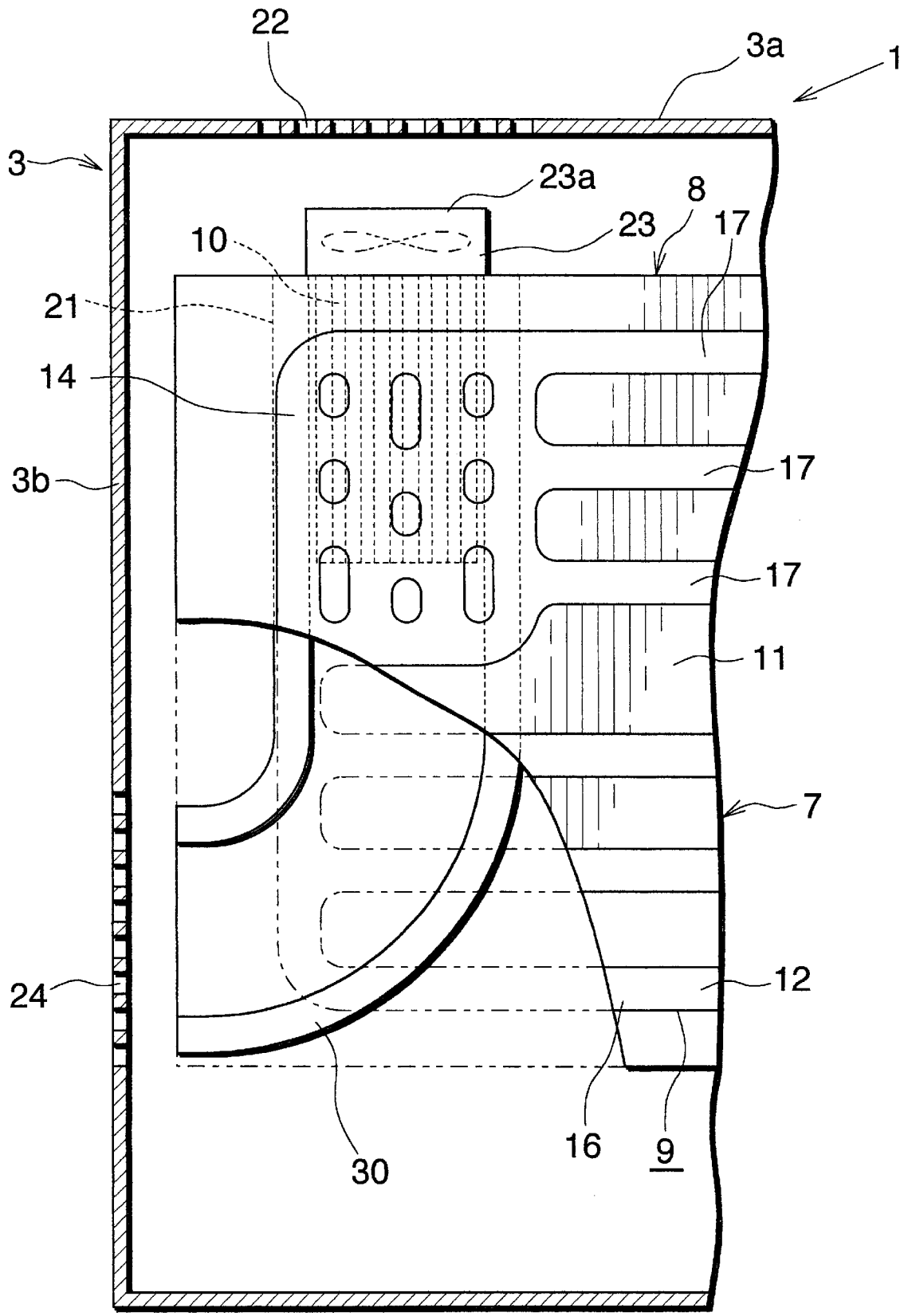
FIG. 5 is a fragmentary view in horizontal section partly broken away and showing a notebook personal computer equipped with a second embodiment of heat sink device of the invention.

FIG. 5 shows a notebook personal computer comprising a second embodiment of heat sink device of the invention.

With reference to FIG. 5, extending from the front end of the cover 21 is a duct 30 for guiding the air taken in through the air inlet 24 from outside the housing 3 to the radiation fin 10. The duct 30 is identical with the cover 21 in cross section, extends forward from the cover front end and is bent leftward, terminating at a position opposed to the air inlet 24. With the exception of this feature, the second embodiment has the same construction as the first shown in FIGS. 1 to 4.

When the fan 23 of the second embodiment is operated, the air of low temperature outside the housing 3 is drawn in through the air inlet 24, guided through the duct 30 to the fin 10, heated with the heat radiated from the fin 10 and then discharged from the housing 3 through the heat removal opening 22. Accordingly, the radiation fin 10 removes heat from the gaseous working liquid flowing into the second latticelike part 14 with an improved efficiency.

Figure 6:
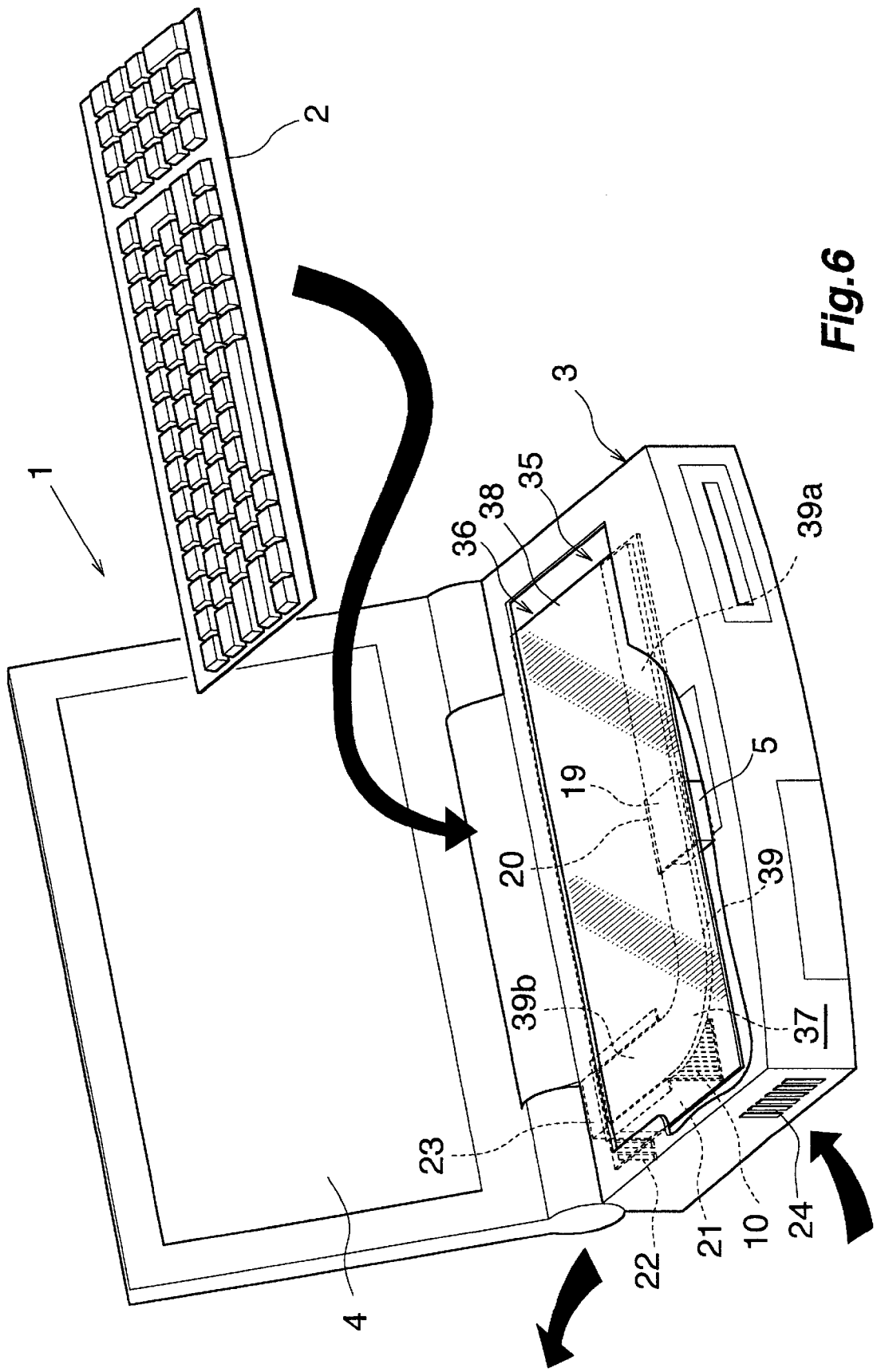
FIG. 6 is a perspective view schematically showing a notebook personal computer equipped with a third embodiment of heat sink device of the invention.
Figure 7:
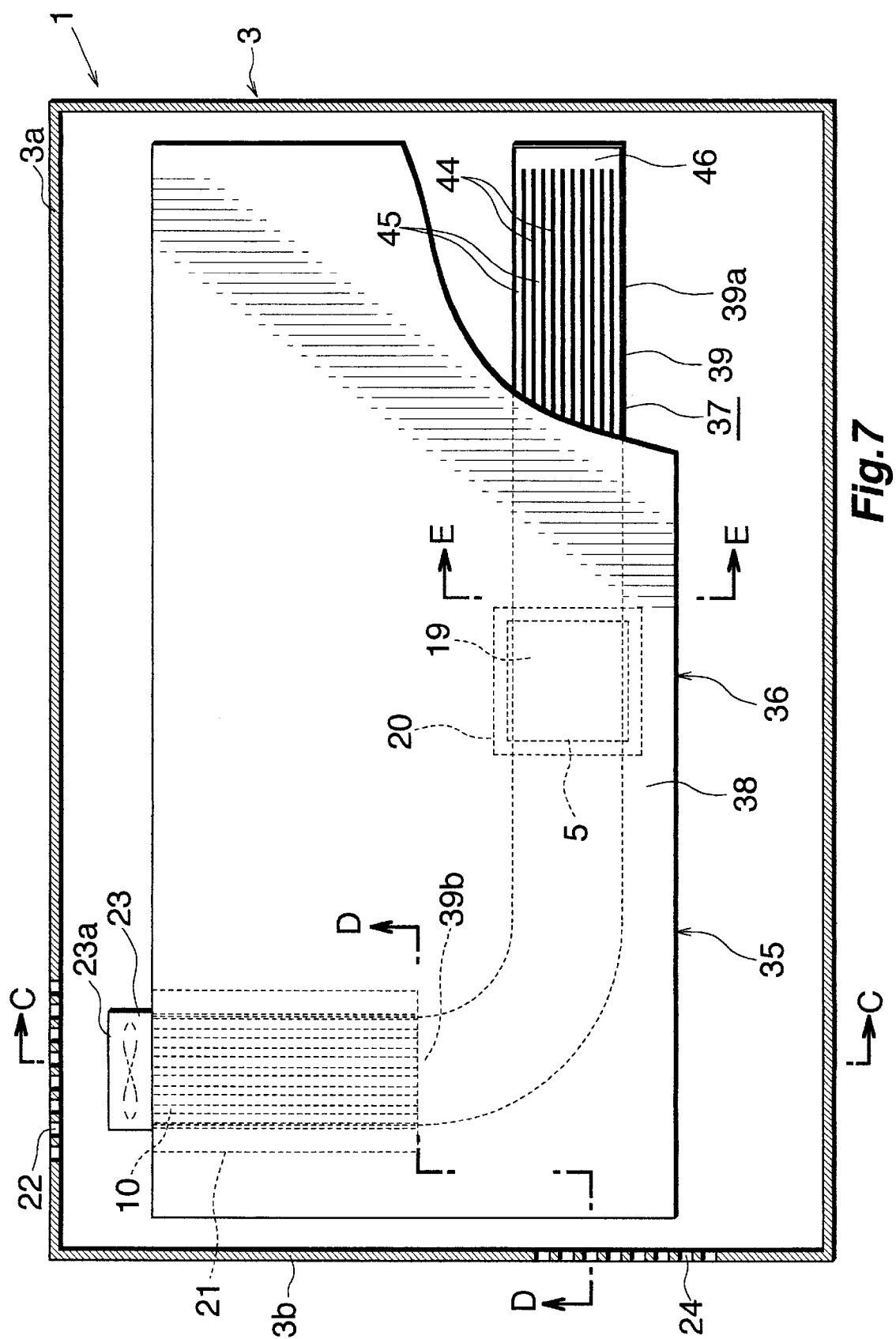
FIG. 7 is a view in horizontal section schematically showing the notebook personal computer equipped with the third embodiment of heat sink device of the invention.
Figure 8:
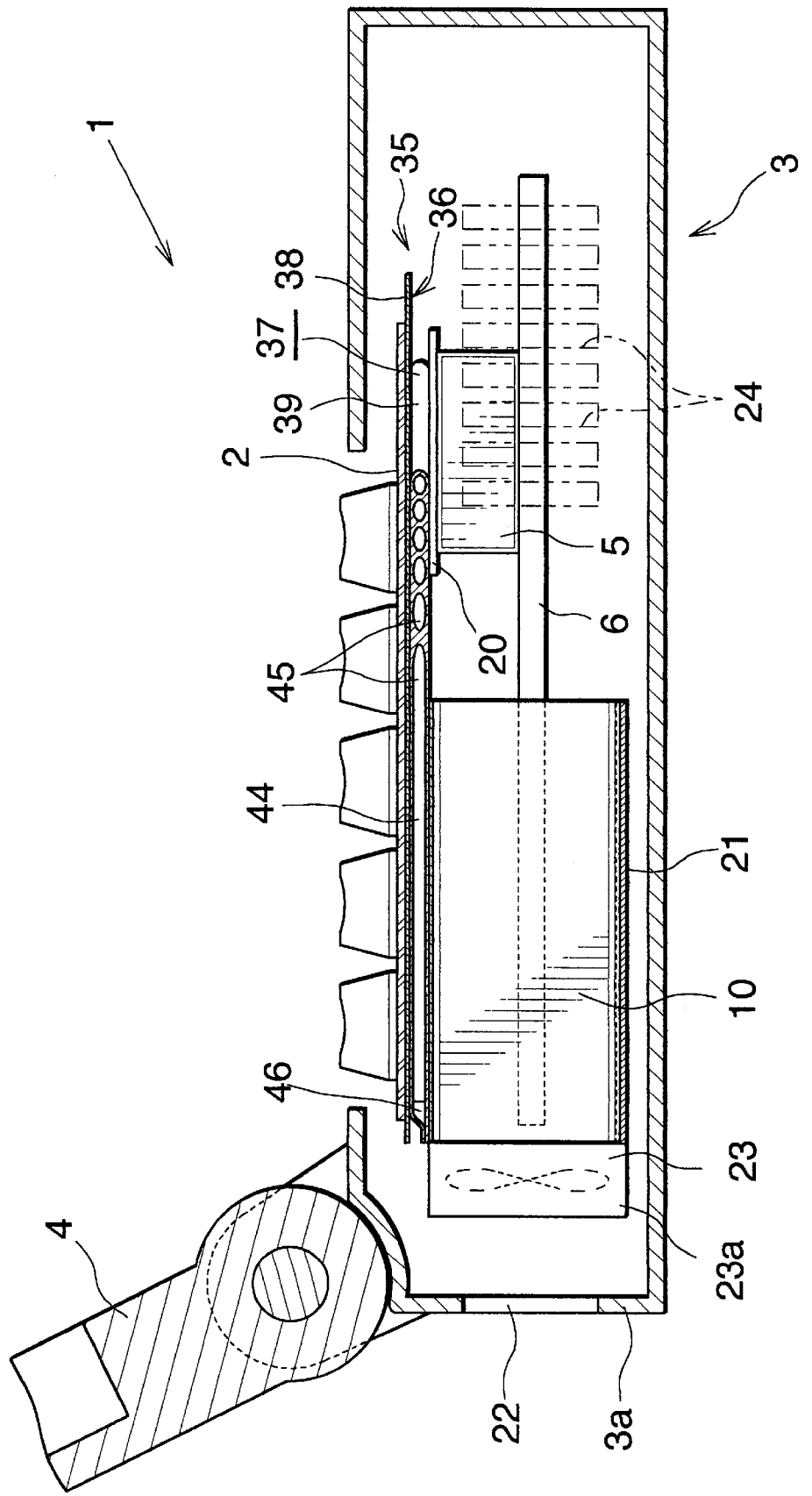
FIG. 8 is an enlarged view in section taken along the line C—C in FIG. 7.
Figure 9:
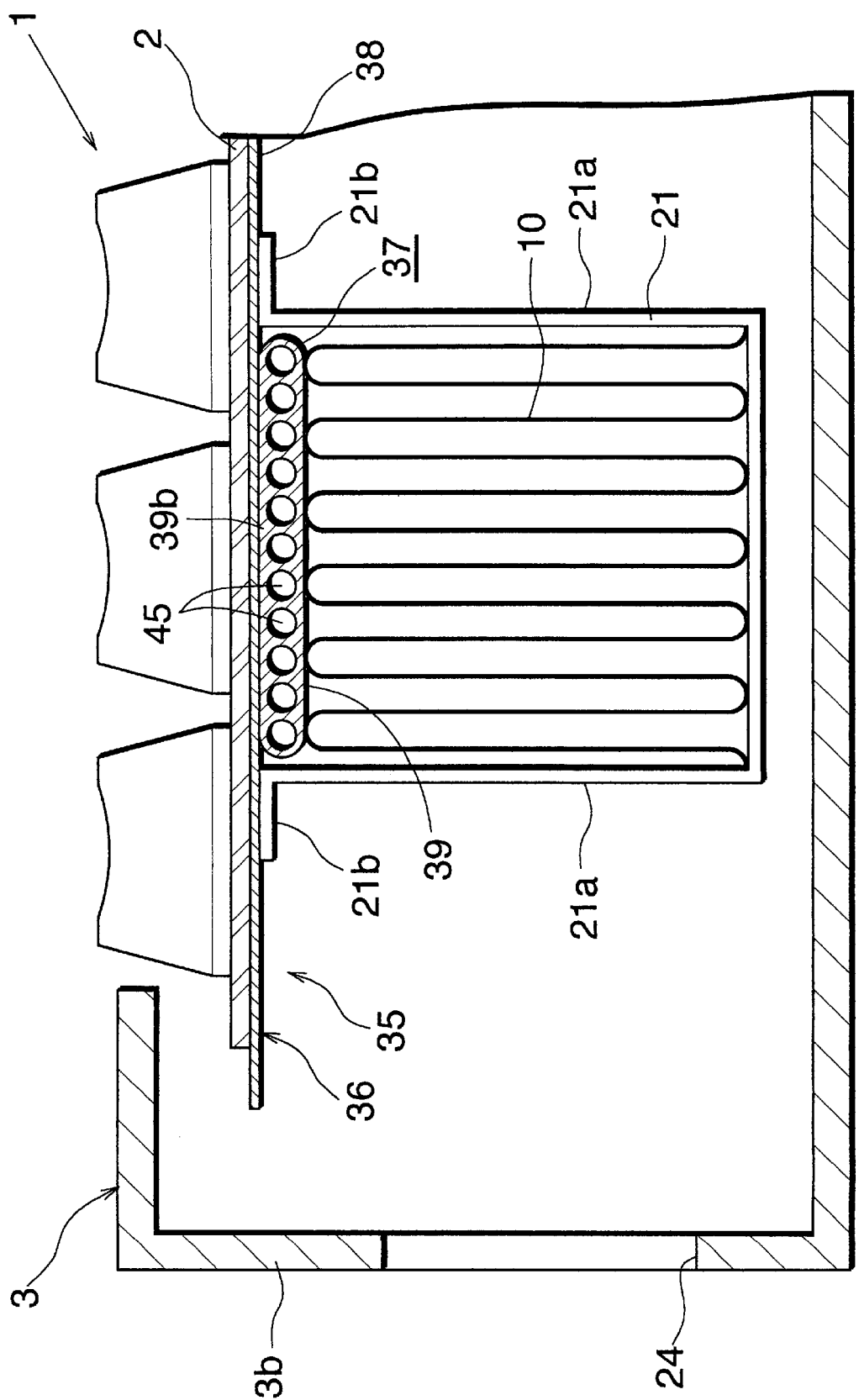
FIG. 9 is an enlarged view in section taken along the line D—D in FIG. 7.
Figure 10:
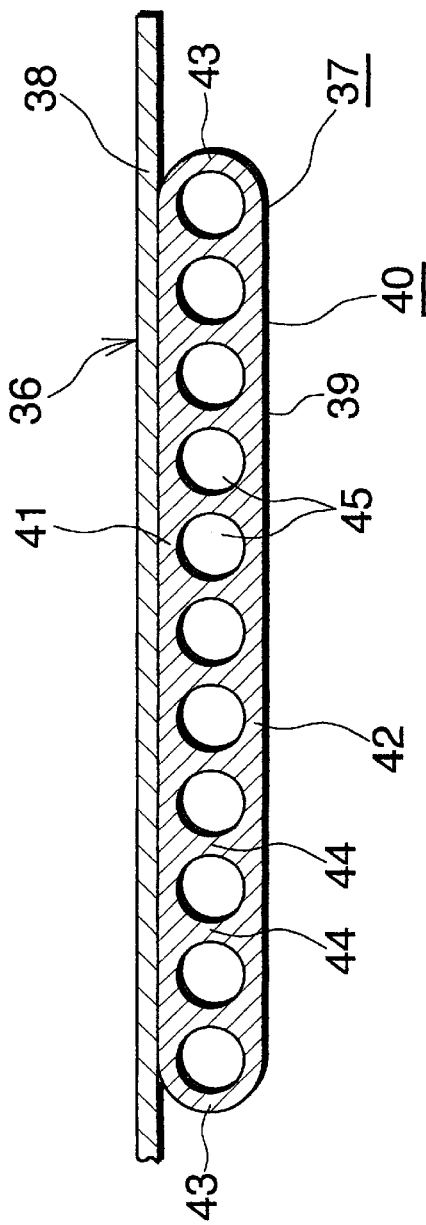
FIG. 10 is an enlarged view in section taken along the line E—E in FIG. 7.

FIGS. 6 to 8 show the overall construction of a notebook personal computer comprising a third embodiment of heat sink device of the invention. FIGS. 9 and 10 each show part of the computer on an enlarged scale.

With reference to FIGS. 6 to 8, a heat sink 35 disposed within the housing 3 of the notebook personal computer 1 comprises a body 36 having a heat pipe portion 37. The body 36 comprises a horizontal aluminum plate 38 which is provided inside the housing 3 between the keyboard 2 and the circuit board 6, and held in contact with the keyboard 2 or spaced apart from the keyboard 2 by a small clearance. The aluminum plate 38 is in the form of a rectangle elongated longitudinally of the housing 3 and has approximately the same size as the keyboard 2. A flat hollow container 39 of aluminum is brazed to the bottom surface of the aluminum plate 38 in face-to-face contact therewith. A working liquid (not shown) is enclosed in the container 39 to provide the heat pipe portion 37.

The container 39 is generally L-shaped when seen from above and comprises a long portion 39a along the front side of the aluminum plate 38 and a short portion 39b along the left side of the plate 38. The radiation fin 10 is attached to the bottom surface of the short portion 39b. As seen in FIG. 10, the container 39 comprises flat upper and lower walls 41, 42, opposite side walls 43 interconnecting widthwise opposite side edges of the upper and lower walls 41, 42, and a plurality of reinforcing walls 44 interconnecting the upper and lower walls 41, 42 between the side walls 43, extending longitudinally of the container 39 and arranged as spaced apart from one another. The container 39 is made by bending an extruded hollow flat aluminum tube 40 to an approximate L shape and closing open opposite ends of the tube. The upper wall 41 of the container 39 is brazed to the aluminum plate 38 in face-to-face contact therewith. The container 39 is internally formed with hollow portions 45 circular in cross section, partitioned by the reinforcing walls 44 and arranged side by side for enclosing the working liquid therein. The reinforcing walls 44 are cut away at opposite ends thereof over a specified length, whereby communicating portions 46 (see FIGS. 7 and 8) are formed respectively at opposite ends of the container 39 internally thereof for holding all the hollow portions 45 in communication. An aluminum sheet 20 is attached to the bottom surface of the container long portion 39a at the lengthwise midportion thereof, with an elastomer (not shown) of high thermal conductivity provided therebetween. The region of the heat pipe portion 37 where the aluminum sheet 20 is attached provides a heat receiving part 19 for receiving the heat generated by the CPU 5.

In the notebook personal computer 1 described, the CPU 5 mounted on the upper surface of the circuit board 6 is in intimate contact with the aluminum sheet 20 beneath the heat receiving part 19 of the heat pipe portion 37. The heat generated by the CPU 5 is transferred to the working liquid in the heat receiving part 19 of the heat pipe portion 37 through the aluminum sheet 20, elastomer of high thermal conductivity and lower wall 42 of the container 39. The working liquid heated with the heat evaporates to a gas in this part 19. The gaseous working liquid flows through the container long portion 39a of the heat pipe portion 37 toward its right end, dissipating heat into the air outside the housing 3 through the upper wall 41 of the container 39, aluminum plate 38 and keyboard 2 and also dissipating heat into the air within the housing 3 through the lower wall 42, upper wall 41 and aluminum plate 38 to become liquefied again. The liquefied working liquid reversely flows and returns to the heat receiving part 19. The gas of working liquid produced in the heat receiving part 19 flows through the container long portion 39a of the heat pipe portion 37 toward its left end and further flows into the short portion 39b. Before flowing into the short portion 39b, a portion of the gas also dissipates heat into the air inside and outside the housing 3 to become partly liquefied again. The gaseous working liquid flowing into the short portion 39b radiates heat into the air outside the housing 3 through the container upper wall 41, aluminum plate 38 and keyboard 2, also dissipates heat into the air within the housing 3 through the lower wall 42 and the radiation fin 10 and is liquefied again. The liquefied working liquid returns to the heat receiving part 19. The portion of working liquid originally remaining in the part of the heat pipe portion 37 other than the heat receiving part 19 flows into this part 19. Through repetitions of such movements, the heat generated by the CPU 5 is radiated into the air inside the housing 3. The fan 23 is held in operation at this time to discharge the heated air from inside the housing 3 via the heat removal opening 22 while causing the air outside the housing 3 to flow into the housing 3 through the air inlet 24. This precludes the heat from being confined in the housing 3, further causing the air having a lower temperature and drawn into the housing 3 from outside to pass through the radiation fin 10 for the fin 10 to achieve an improved heat dissipation efficiency.

Although the container 39 of the heat pipe portion 37 is brazed to the bottom surface of the aluminum plate 38 according to the third embodiment described, the container 39 may be brazed to the upper surface of the aluminum plate 38, or to each of the upper and lower surfaces of the aluminum plate 38. The container 39 may be welded to the aluminum plate 38. The container 39 may be attached to the plate 38 with an elastomer of high thermal conductivity or adhesive.

Figure 11:
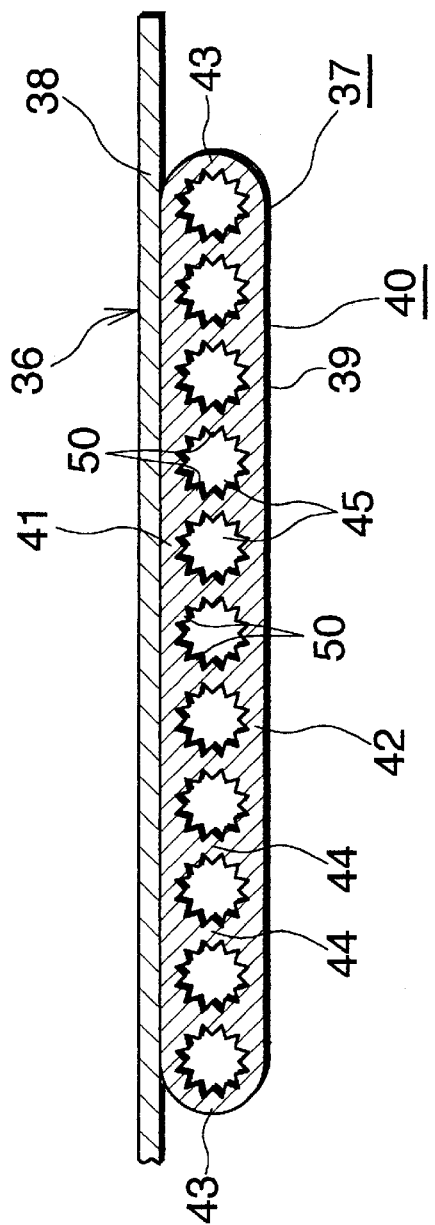
FIG. 11 is a sectional view corresponding to FIG. 10 and showing a modification of flat hollow container.

FIG. 11 shows a modification of the flat hollow container 39 of the heat pipe portion 37. With reference to FIG. 11, the inner peripheral surface defining each liquid enclosing hollow portion 45 of the container 39 is integrally formed with a plurality of inner fins 50 extending longitudinally thereof and arranged at a spacing circumferentially of the surface.

Figure 12:
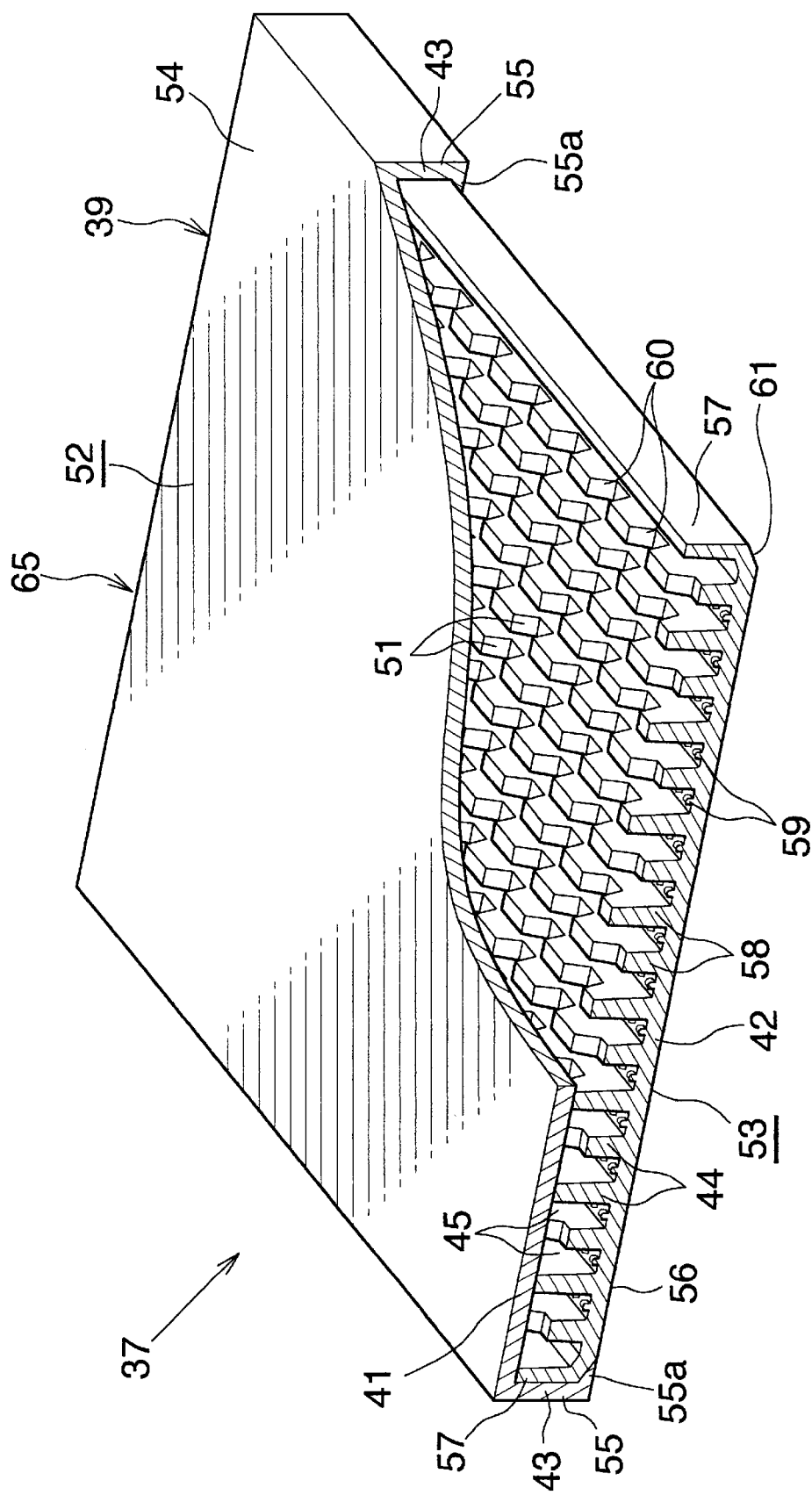
FIG. 12 is a fragmentary perspective view partly broken away and showing another modification of flat hollow container.

FIG. 12 shows another modification of the flat hollow container 39 of the heat pipe portion 37.

With reference to FIG. 12, the modified container 39 has reinforcing walls 44 which are formed with a plurality of communication holes 51 for causing parallel working liquid enclosing portions 45 to communicate with one another. The communication holes 51 are in a staggered arrangement when seen from above. When the holes 51 are formed, the working liquid flowing through the parallel enclosing portions 45 also flows through the holes 51 widthwise of the heat pipe portion 8, spreading through all the enclosing portions 45 to become stirred.

The container 39 comprises a flat tubular body 65 which comprises an upper component 52 in the form of an aluminum plate and providing an upper wall 41 and opposite side walls 43, and lower component 53 in the form of an aluminum plate and providing a lower wall 42, opposite side walls 43 and the reinforcing walls 44. The container 39 is formed by closing open opposite ends of the tubular body 65. The upper component 52 comprises an upper wall forming portion 54, and side wall forming portions 55 downwardly projecting respectively from opposite side edges of the portion 54 integrally therewith. The lower component 53 comprises a lower wall forming portion 56, side wall forming portions 57 upwardly projecting respectively from opposite side edges of this portion 56 integrally therewith, and reinforcing wall forming portions 58 inwardly projecting from the lower wall forming portion 56 integrally therewith. Between each pair of adjacent reinforcing walls 58, the lower wall forming portion 56 is formed on its upper surface with a plurality of upward projections 59 integrally therewith and arranged at a spacing longitudinally of the portion 56. A plurality of cutouts 60 are formed in the upper edges of the reinforcing wall forming portions 58 and arranged at a spacing longitudinally of the portions 58, the upper ends of the portions 58 are brazed to the upper wall 41, and the openings of the cutouts 60 are closed with the upper wall 41, whereby the communication holes 51 are formed. The lower component 53 is formed at each of opposite side edges of its bottom with a slope 61 slanting laterally upward.

The upper component 52 and the lower component 53 are fitted to each other so that the side wall forming portions 55 of the upper component 52 are positioned outside of and lap over the respective side wall forming portions 57 of the lower component 53. The lower end of each side wall forming portion 55 is bent inward, and the inward bent portion 55a is engaged with the slope 61 in intimate contact therewith, whereby the two components 52, 53 are tacked together. In this state, each side wall forming portion 57 and the corresponding side wall forming portion 55 are brazed to each other, the upper ends of the reinforcing wall forming portions 58 are brazed to the upper wall forming portion 54, and each inward bent portion 55a is brazed to the corresponding slope 61, whereby the container 39 is formed.

Figure 13:
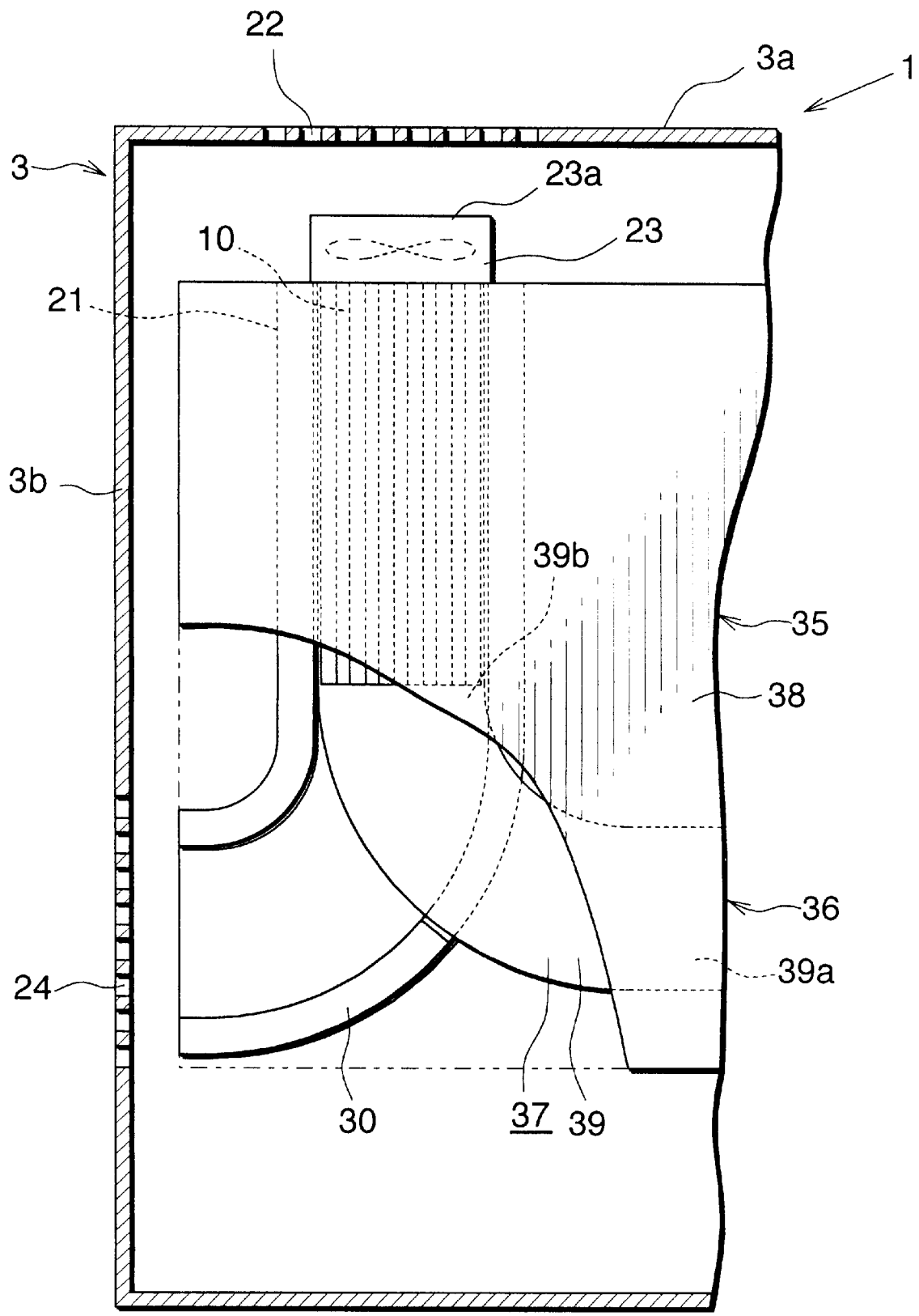
FIG. 13 is a fragmentary view in horizontal section partly broken away and showing a notebook personal computer equipped with a fourth embodiment of heat sink device of the invention.

FIG. 13 shows a notebook personal computer comprising a fourth embodiment of heat sink device of the invention.

With reference to FIG. 13, extending from the front end of the cover 21 is a duct 30 for guiding the air taken in through the air inlet 24 from outside the housing 3 to the radiation fin 10. The duct 30 is identical with the cover 21 in cross section, extends forward from the cover front end and is bent leftward, terminating at a position opposed to the air inlet 24. The duct 30 is partly cut away to avoid interference with the container 39 of the heat pipe portion 37. With the exception of this feature, the fourth embodiment has the same construction as the third shown in FIGS. 6 to 10.

When the fan 23 of the fourth embodiment is operated, the air of low temperature outside the housing 3 is drawn in through the air inlet 24, guided through the duct 30 to the fin 10, heated with the heat radiated from the fin 10 and then discharged from the housing 3 through the heat removal opening 22. Accordingly, the radiation fin 10 removes heat from the gaseous working liquid flowing into the short container portion 39b with an improved efficiency.

Figure 14:
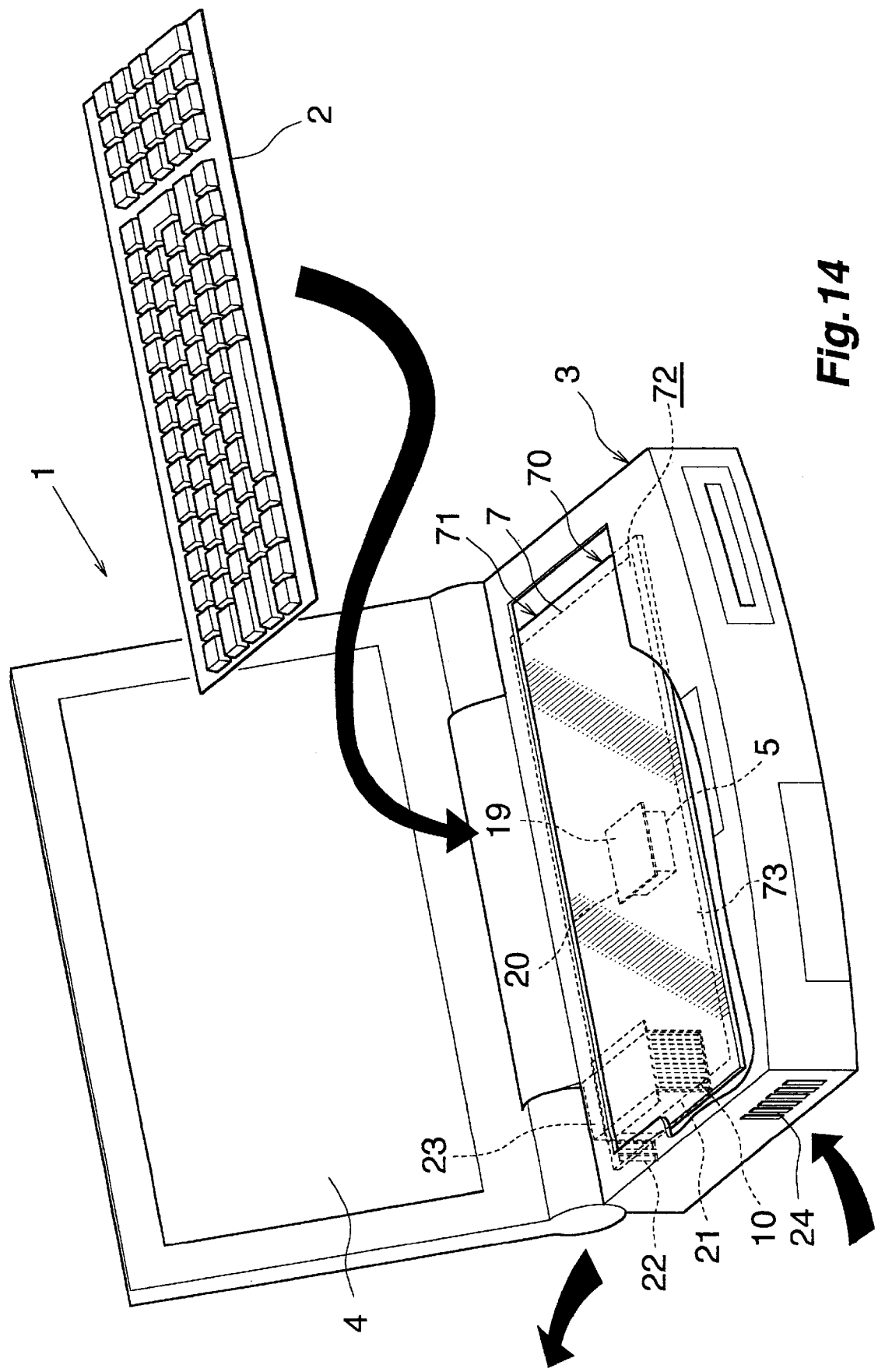
FIG. 14 is a perspective view schematically showing a notebook personal computer equipped with a fifth embodiment of heat sink device of the invention.
Figure 15:
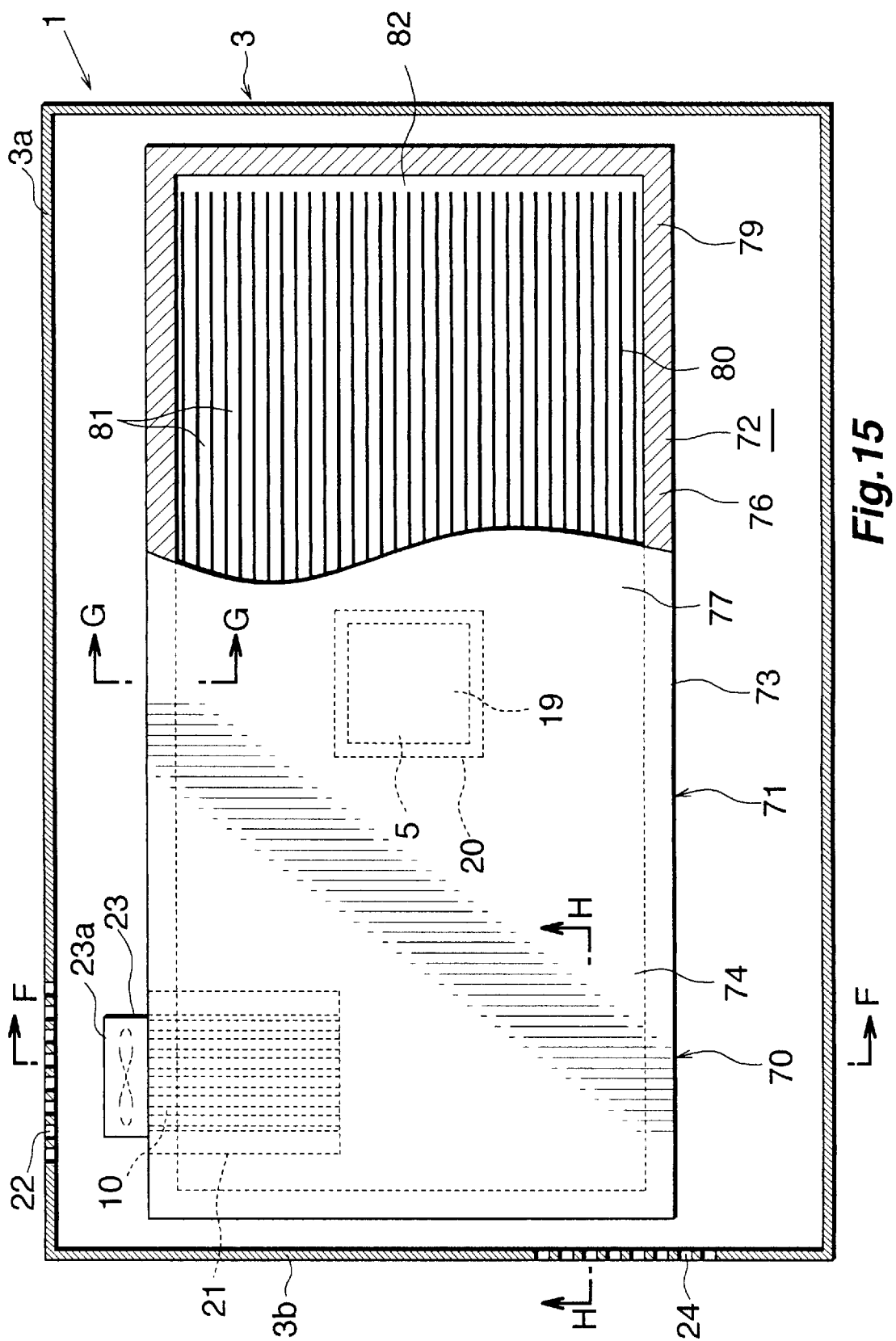
FIG. 15 is a view in horizontal section schematically showing the notebook personal computer equipped with the fifth embodiment of heat sink device of the invention.
Figure 16:
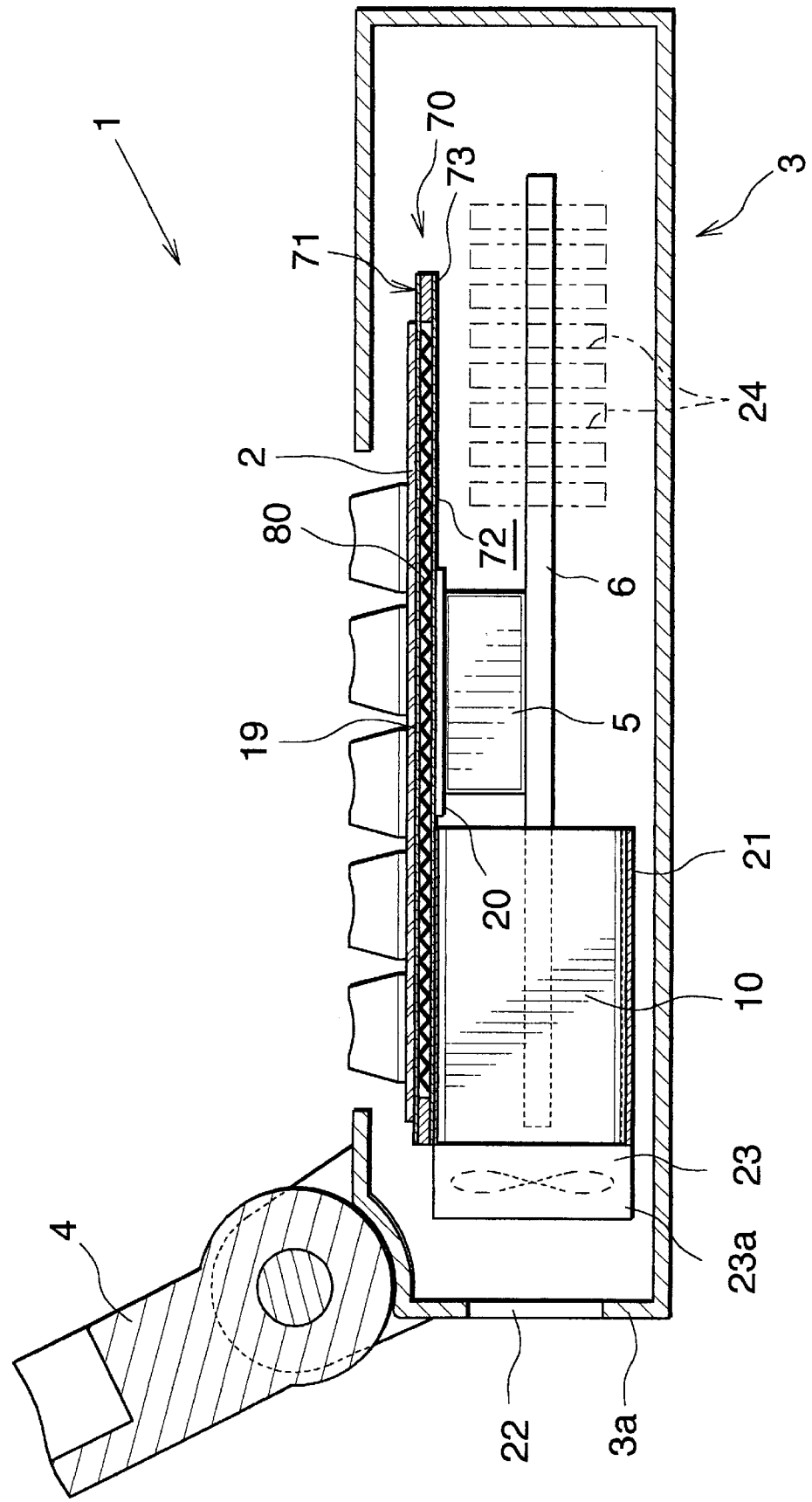
FIG. 16 is an enlarged view in section taken along the line F—F in FIG. 15.
Figure 17:
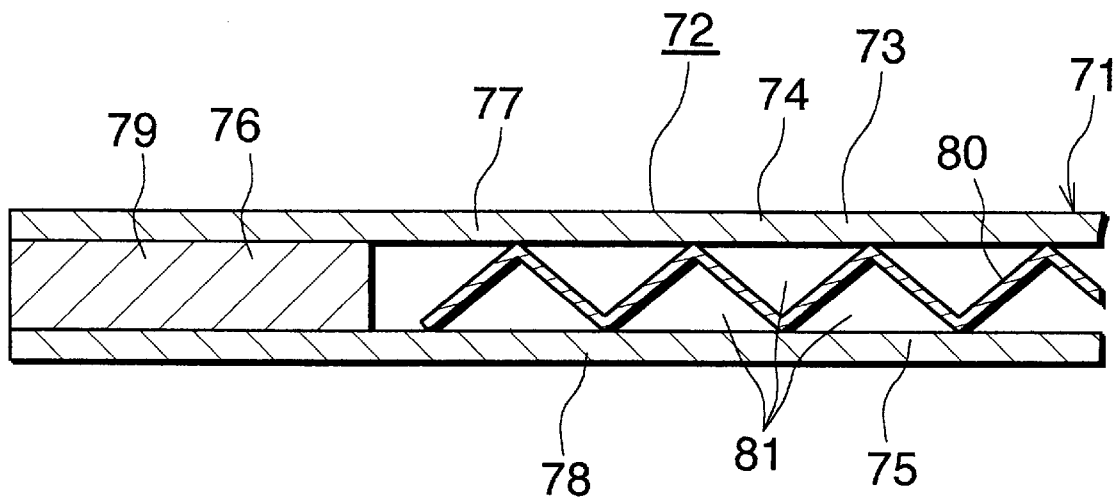
FIG. 17 is an enlarged view in section taken along the line G—G in FIG. 15.
Figure 18:
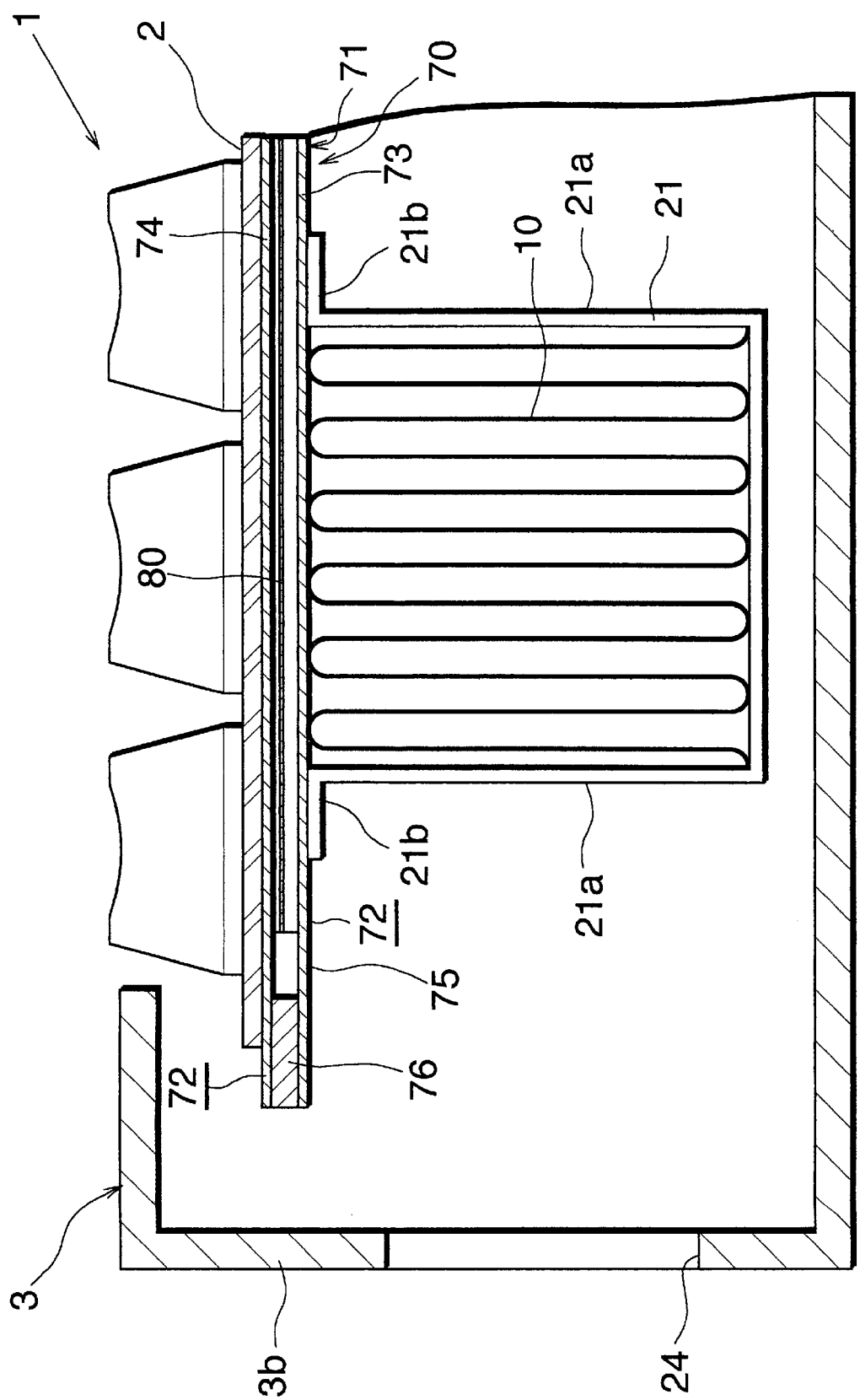
FIG. 18 is an enlarged view in section taken along the line H—H in FIG. 15.

FIGS. 14 to 16 show the overall construction of a notebook personal computer comprising a fifth embodiment of heat sink device of the invention. FIGS. 17 and 18 each show part of the computer on an enlarged scale.

With reference to FIGS. 14 to 16, a heat sink 70 disposed within the housing 3 of the notebook personal computer 1 comprises a body 71 having a heat pipe portion 72. The body 71 comprises a horizontal flat hollow container 73 which is provided inside the housing 3 between the keyboard 2 and the circuit board 6, and held in contact with the keyboard 2 or spaced apart from the keyboard 2 by a small clearance. A working liquid (not shown) is enclosed in the container 73 to provide the heat pipe portion 72.

The container 73 is in the form of a rectangle elongated longitudinally of the housing 3 and has approximately the same size as the keyboard 2. A radiation fin 10 is attached to the bottom surface of the container 73 at a left-end rear portion thereof. As shown in FIG. 17, the container 73 comprises flat upper and lower walls 74, 75, and a peripheral wall 76 interconnecting the peripheral edges of the respective upper and lower walls 74, 75. The container 73 is formed of an upper aluminum plate 77 providing the upper wall 74, a lower aluminum plate 78 providing the lower wall 75, and a framelike aluminum spacer 79 interposed between the peripheral edges of the upper and lower plates 77, 78, brazed to the upper and lower plates 77, 78 and providing the peripheral wall 76. An inner fin 80 in the form of a corrugated aluminum fin is provided inside the container 73. The inner fin 80 is so positioned that the crests and furrows thereof extend longitudinally of the container, and is brazed to the upper wall 74 and the lower wall 75. The inner fin 80 forms a plurality of working liquid enclosing portions 81 extending inside the container 73 longitudinally thereof and arranged in parallel. The inner fin 80 is smaller than the container 73 in length, and a communication portion 82 where no portion of the fin 80 is present is formed in the interior of the container 73 at each of left and right ends thereof. The communication portion 82 serves to hold all the enclosing portions 81 in communication. An aluminum sheet 20 is attached to the bottom of container 73 of the heat pipe portion 72 in the center thereof, with an elastomer of high thermal conductivity (not shown) provided therebetween. The region of the heat pipe portion 72 where the aluminum sheet 20 is provided serves as a heat receiving part 19 for receiving the heat generated by the CPU 5.

In the notebook personal computer 1 described, the CPU 5 mounted on the upper surface of the circuit board 6 is in intimate contact with the aluminum sheet 20 beneath the heat receiving part 19 of the heat pipe portion 72. The heat generated by the CPU 5 is transferred to the working liquid in the heat receiving part 19 of the heat pipe portion 72 through the aluminum sheet 20, elastomer of high thermal conductivity and lower wall 75 of the container 73. The working liquid heated with the heat evaporates to a gas in this part 19. The gaseous working liquid flows through the heat pipe portion 72 toward its left and right ends, dissipating heat into the air outside the housing 3 through the upper wall 74 of the container 73 and keyboard 2 and also dissipating heat into the air within the housing 3 through the lower wall 75 to become liquefied again. The liquefied working liquid reversely flows and returns to the heat receiving part 19. The gaseous working liquid flowing through the heat pipe portion 72 toward its left end radiates heat into the air outside the housing 3 through the upper wall 74 and keyboard 2, also dissipates heat into the air within the housing 3 through the lower wall 75 and the radiation fin 10 and is liquefied again. The liquefied working liquid returns to the heat receiving part 19. The portion of working liquid originally remaining in the part of the heat pipe portion 72 other than the heat receiving part 19 flows into this part 19. Through repetitions of such movements, the heat generated by the CPU 5 is radiated into the air inside the housing 3. The fan 23 is held in operation at this time to discharge the heated air from inside the housing 3 via the heat removal opening 22 while causing the air outside the housing 3 to flow into the housing 3 through the air inlet 24. This precludes the heat from being confined in the housing 3, further causing the air having a lower temperature and introduced into the housing 3 from outside to pass through the radiation fin 10 for the fin 10 to achieve an improved heat dissipation efficiency.

Figure 19:
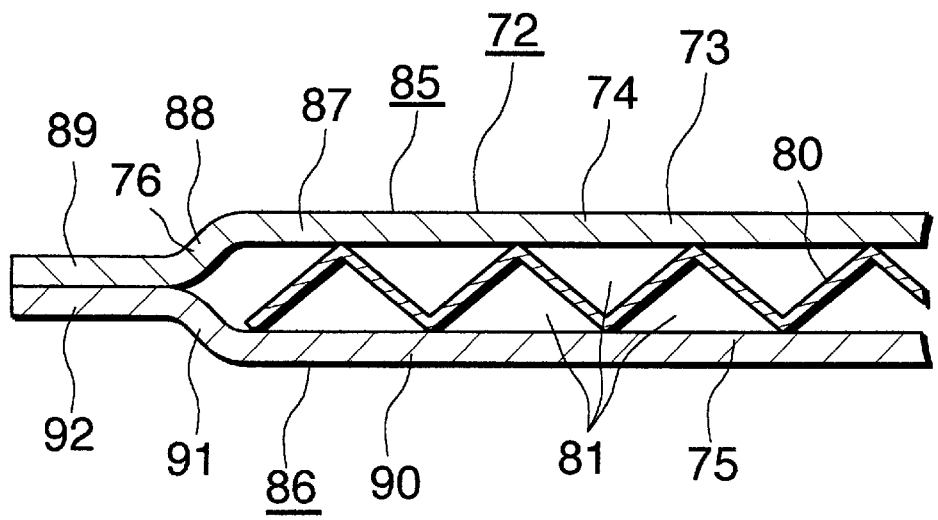
FIG. 19 is a sectional view corresponding to FIG. 17 and showing a modification of flat hollow container.

FIG. 19 shows a modification of the container 73 of the heat pipe portion 72.

With reference to FIG. 19, the modified container 73 is formed of an upper component 85 in the form of an aluminum plate and providing an upper wall 74 and a peripheral wall 76, and a lower component 86 in the form of an aluminum plate and providing a lower wall 75 and the peripheral wall 76. The upper component 85 comprises an upper wall forming portion 87, and a peripheral wall forming portion 88 formed integrally with the peripheral edge of the portion 87 in a downwardly protuberant shape. The peripheral wall forming portion 88 has an outward flange 89 integral with its lower end. The lower component 86 comprises a lower wall forming portion 90, and a peripheral wall forming portion 91 formed integrally with the peripheral edge of the portion 90 in an upwardly protuberant shape. The peripheral wall forming portion 91 has an outward flange 92 integral with its upper end.

The flange 89 of the upper component 85 and the flange 92 of the lower component 86 are brazed to each other face-to-face, whereby the container 73 is formed.

According to the fifth embodiment described, the container 73 of the heat pipe portion 72 is disposed within the housing 3 between the keyboard 2 and the circuit board 6, and the CPU 5 mounted on the upper surface of the circuit board 6 is in contact with the bottom of the container. In the case where the CPU 5 is attached to the lower surface of the circuit board 6, the container 73 of the heat pipe portion 72 is disposed below the circuit board 6, with the CPU 5 in contact with the upper surface of the container 73.

Figure 20:
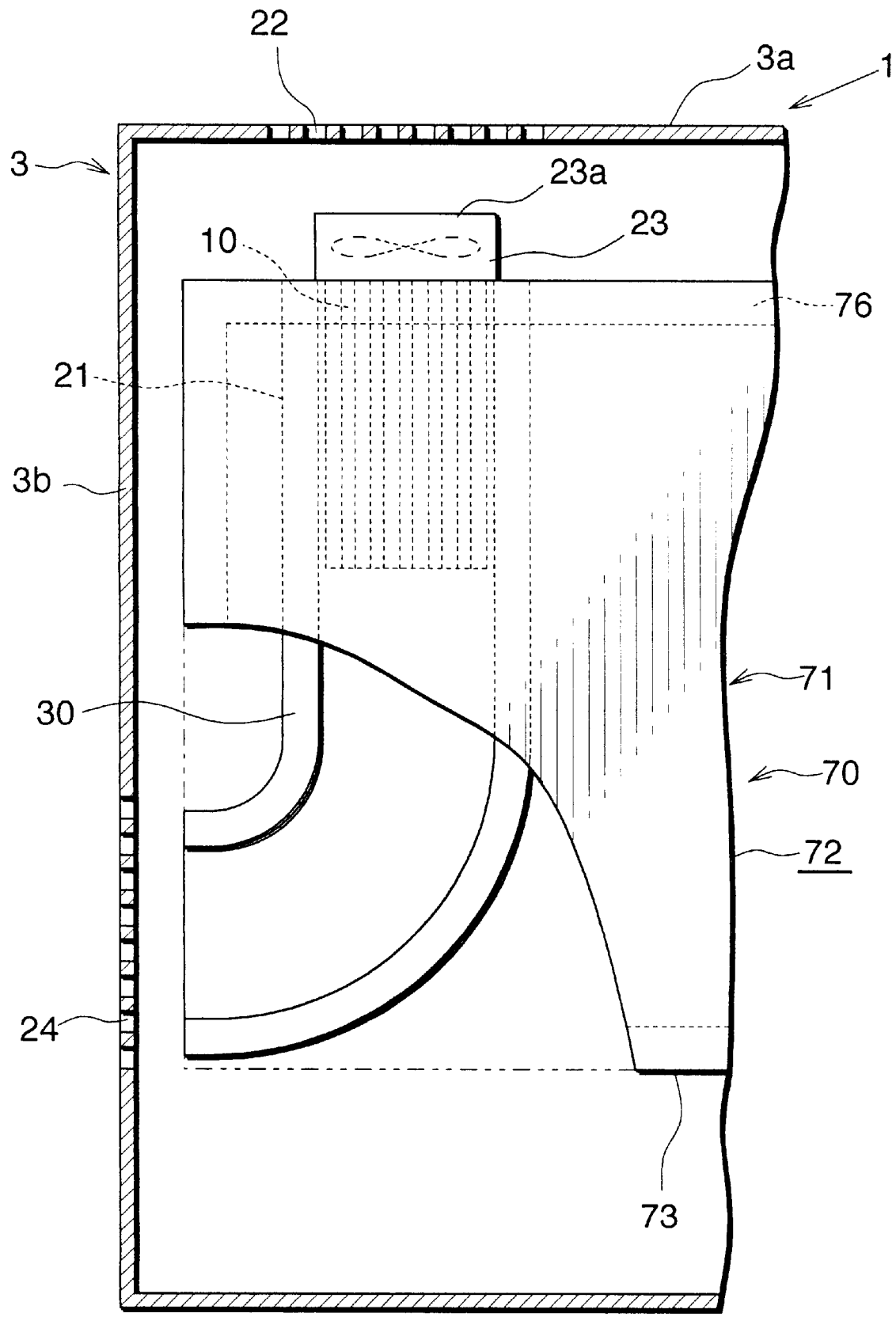
FIG. 20 is a fragmentary view in horizontal section partly broken away and showing a notebook personal computer equipped with a sixth embodiment of heat sink device of the invention.

FIG. 20 shows a notebook personal computer comprising a sixth embodiment of heat sink device of the invention.

With reference to FIG. 20, extending from the front end of the cover 21 is a duct 30 for guiding the air taken in through the air inlet 24 from outside the housing 3 to the radiation fin 10. The duct 30 is identical with the cover 21 in cross section, extends forward from the cover front end and is bent leftward, terminating at a position opposed to the air inlet 24. With the exception of this feature, this embodiment has the same construction as the fifth shown in FIGS. 14 to 18.

When the fan 23 of the sixth embodiment is operated, the air of low temperature outside the housing 3 is taken in through the air inlet 24, guided through the duct 30 to the fin 10, heated with the heat radiated from the fin 10 and then discharged from the housing 3 through the heat removal opening 22. Accordingly, the radiation fin 10 removes heat from the gaseous working liquid flowing through the heat pipe portion 72 toward its left end with an improved efficiency.

Figure 21:
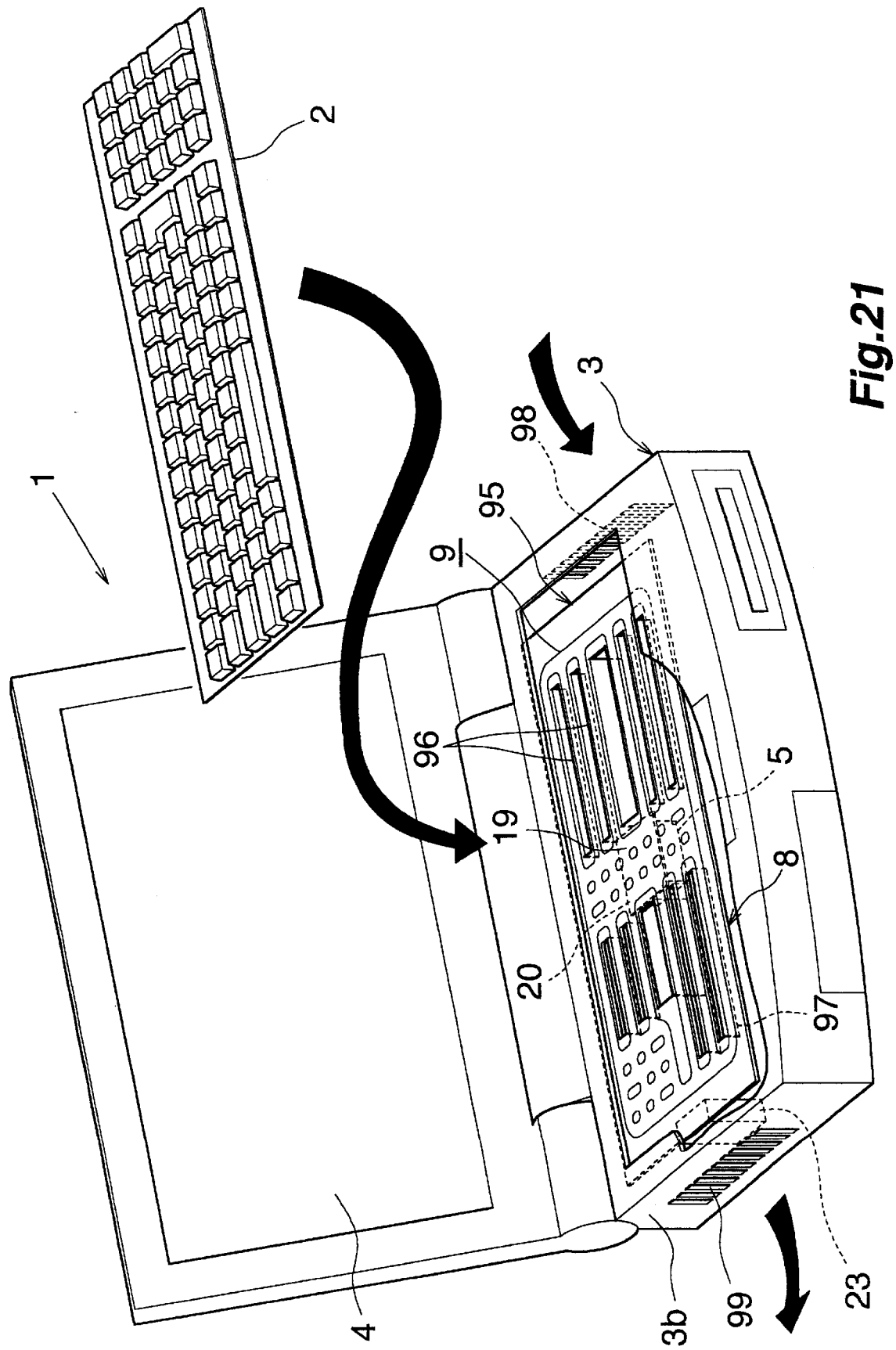
FIG. 21 is a perspective view schematically showing a notebook personal computer equipped with a seventh embodiment of heat sink device of the invention.
Figure 22:
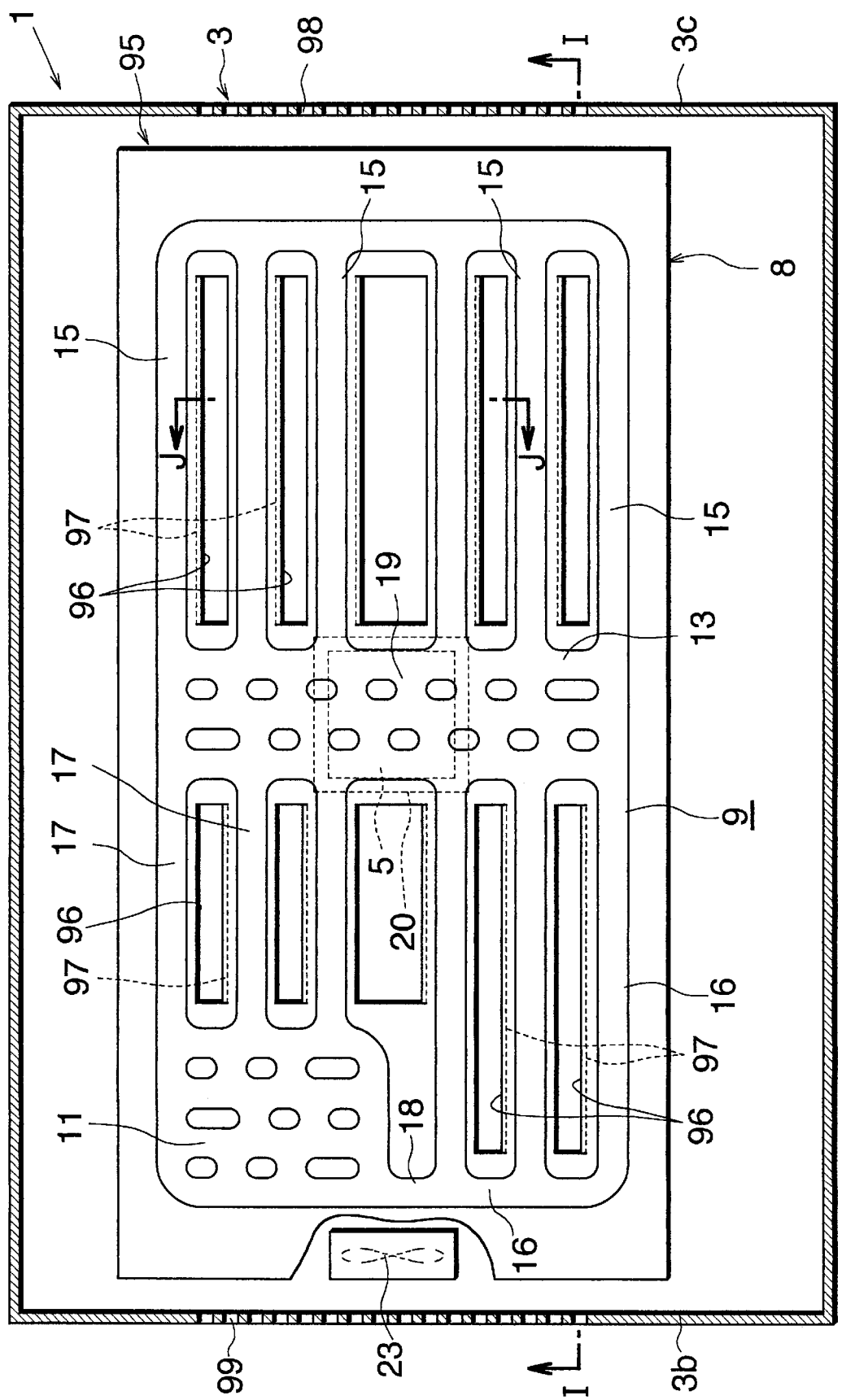
FIG. 22 is a view in horizontal section schematically showing the notebook personal computer equipped with the seventh embodiment of heat sink device of the invention.
Figure 23:
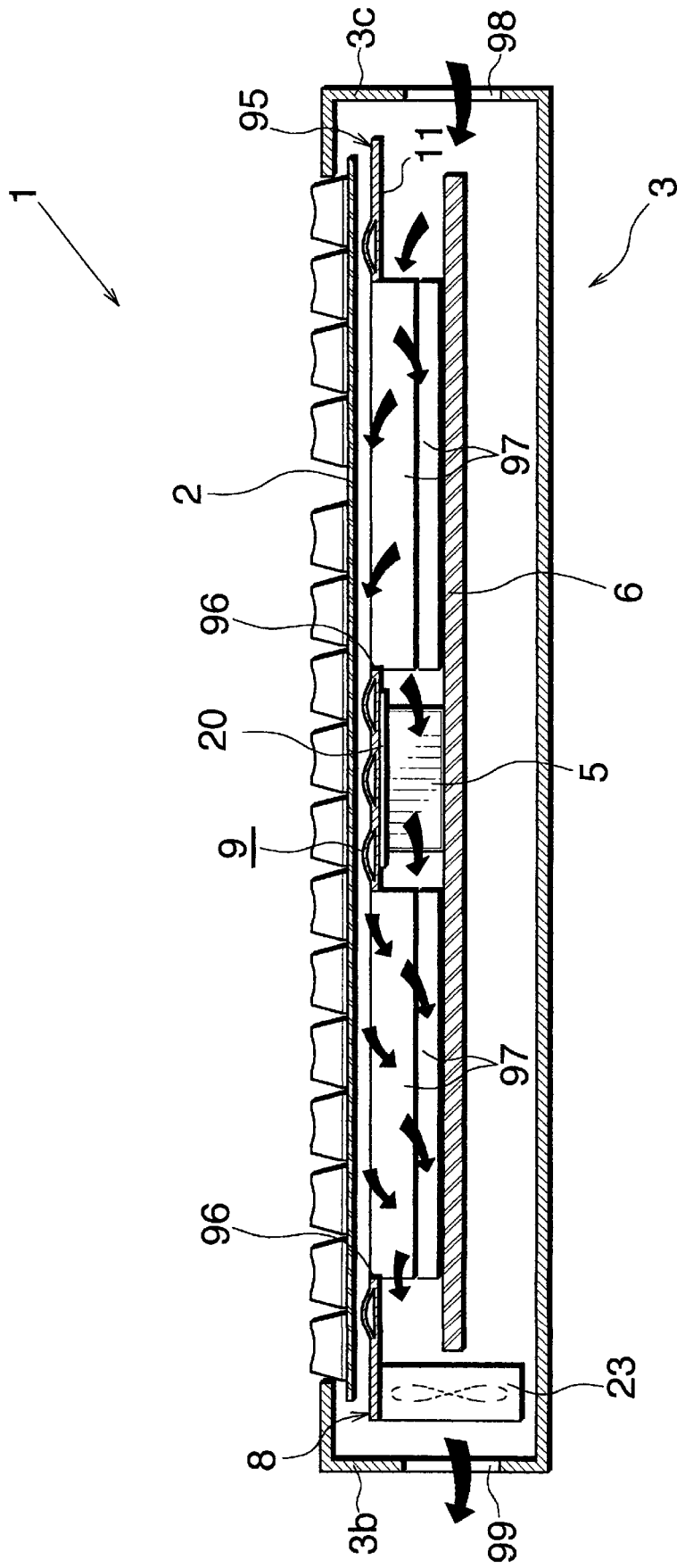
FIG. 23 is a view in section taken along the line I—I in FIG. 22.
Figure 24:
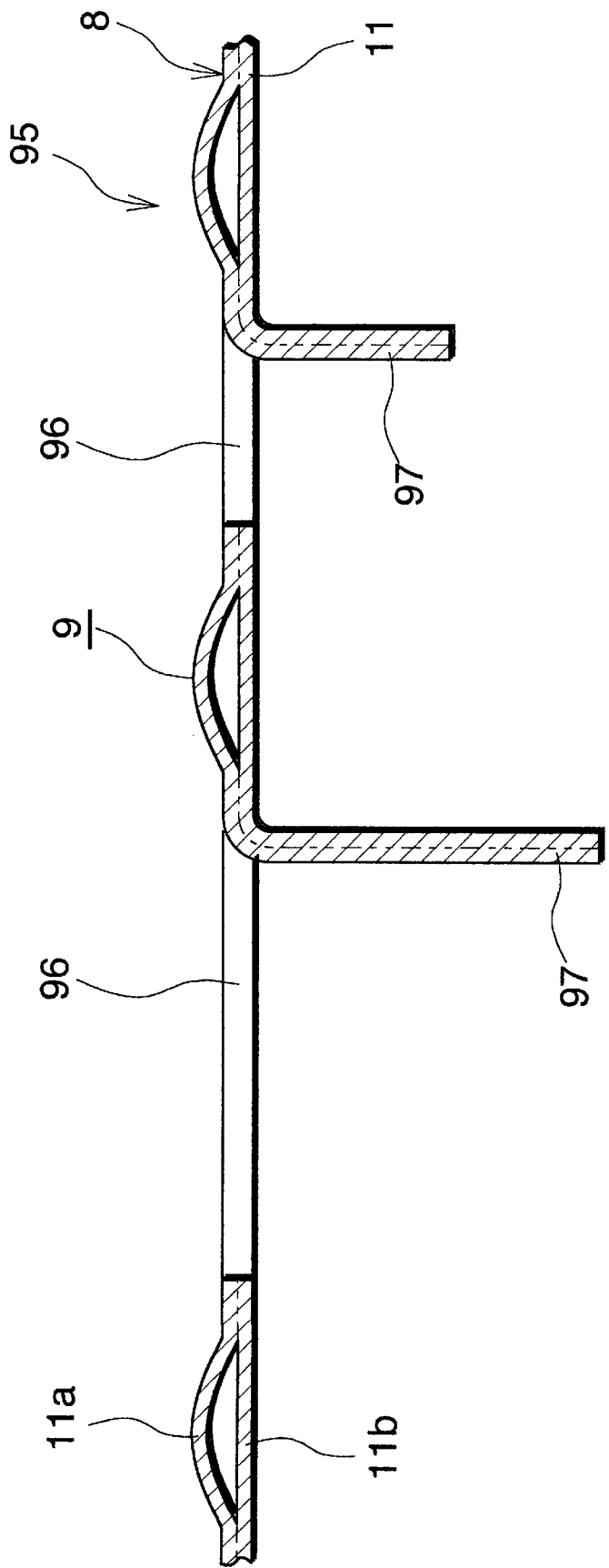
FIG. 24 is an enlarged view in section taken along the line J—J in FIG. 22.

FIGS. 21 to 23 show the overall construction of a notebook personal computer comprising a seventh embodiment of heat sink device of the invention. FIG. 24 shows part of the computer on an enlarged scale.

With reference to FIGS. 21 to 23, a heat sink 95 disposed within the housing 3 of the notebook personal computer 1 comprises a body 8 in the form of an aluminum plate and having a heat pipe portion 9. The body 8 comprises a horizontal aluminum base plate 11.

Holes 96 extending longitudinally of the aluminum base plate 11 are formed in the base plate 11 in respective regions thereof other than the area of the head pipe portion 9, i.e., the regions surrounded by the respective loop parts 15, 16, and the regions between the adjacent straight parts 17 at the left of the first latticelike part 13. A fin 97 extending longitudinally of the base plate and projecting downward is formed along one of the front and rear edges defining each of the holes 96 integrally with the edge (see FIG. 24). The hole 96 and fin 97 are formed at the same time by slitting the base plate 11.

An air inlet 98 is formed in the right side wall 3c of the computer housing 3 at the midportion of its width, and an air outlet 99 in the left side wall 3b of the same at the midportion of its width as opposed to the inlet. An axial-flow fan 23 is disposed beneath a left-end bottom portion of the base plate 11 with its axis of rotation extending longitudinally of the plate. The axial-flow fan 23 serves to introduce air into the housing 3 from outside through the air inlet 98 and to discharge air from inside the housing 3 through the air outlet 99. The axial-flow fan 23 may be replaced by a fan of other type.

In the notebook personal computer 1 described, the CPU 5 mounted on the upper surface of the circuit board 6 is in intimate contact with an aluminum sheet 20 beneath the aluminum base plate 11. The heat generated by the CPU 5 is transferred to the working liquid in the heat receiving part 19 of the heat pipe portion 9 through the aluminum sheet 20, elastomer of high thermal conductivity and lower aluminum sheet 11b of the base plate 11. The working liquid heated with the heat evaporates to a gas in this part 19. The gaseous working liquid flows through the heat pipe portion 9 to move away from the heat receiving part 19, dissipating heat into the air inside the housing 3 through the aluminum base plate 11 and the radiation fins 97 to become liquefied again. The liquefied working liquid circulates through the heat pipe portion 9 or reversely flows and returns to the heat receiving part 19. The portion of working liquid originally remaining in the part of the heat pipe portion 9 other than the heat receiving part 19 flows into this part 19. Through repetitions of such movements, the heat generated by the CPU 5 is radiated into the air inside the housing 3. When the fan 23 is held in operation at this time, the air of low temperature outside the housing 3 is introduced into the housing 3 through the air inlet 98, further flows along the upper and lower surfaces of the aluminum base plate 11 while partly passing through the holes 96, is heated with the heat radiating from the base plate 11 and fins 97 and is then discharged as heated from inside the housing 3 through the air outlet 99. The flow of air therefore achieves a high heat dissipation efficiency.

What is claimed is:

1. A heat sink device for use in an electronic device for dissipating into the atmosphere outside a housing of the electronic device the heat generated by an electronic component disposed within the housing, the housing having a peripheral wall formed with a heat removal opening, a heat sink being disposed within the housing, the heat sink comprising a body having a heat pipe portion, and a radiation fin attached to the body in the vicinity of the heat removal opening and opposed to the opening, wherein the body comprises a base plate having two opposite surfaces, said base plate comprising a plurality of metal sheets joined to one another in superposed layers, a hollow portion being formed in a required pattern between one of the two metal sheets providing opposite surfaces of the base plate and the metal sheet adjacent to said one metal sheet, a working liquid being enclosed in the hollow portion to provide the heat pipe portion, the heat pipe portion having a heat receiving part for receiving the heat generated by the electronic component, the radiation fin being attached to the body at a location a predetermined distance away from the heat receiving part of the heat pipe portion, wherein the radiation fin is attached to one of the opposite surfaces of the base plate of the body which surface is flat and not forming the working liquid enclosing portion.

2. A heat sink device for use in an electronic device according to claim 1 which further comprises a blower for sending out air from inside the housing to outside through the heat removal opening after passing the air through the radiation fin.

3. A heat sink device for use in an electronic device for dissipating into the atmosphere outside a housing of the electronic device the heat generated by an electronic component disposed within the housing, the housing having a peripheral wall formed with a heat removal opening, a heat sink being disposed within the housing the heat sink comprising a body having a heat pipe portion, and a radiation fin attached to the body in the vicinity of the heat removal opening and opposed to the opening, wherein the body comprises a horizontal metal plate having two opposite surfaces, and a flat hollow metal container having two opposite surfaces is joined by a first one of its opposite surfaces to a first one of the opposite surfaces of the metal plate such that the first surface of the flat hollow metal container is in face-to-face contact with the first surface of the metal plate, a working liquid being enclosed in the container to provide the heat pipe portion, the radiation fin being attached to the other of the opposite surfaces of the container.

4. A heat sink device for use in an electronic device according to claim 3 wherein the flat hollow container comprises a tubular body composed of flat upper and lower walls, opposite side walls interconnecting opposite side edges of the upper and lower walls, and a plurality of reinforcing walls interconnecting the upper and lower walls between the side walls, extending longitudinally of the container and arranged as spaced apart from one another, the container being formed by closing open opposite ends of the tubular body, the container being internally formed with a plurality of working liquid enclosing portions partitioned by the reinforcing walls and arranged in parallel.

5. A heat sink device for use in an electronic device according to claim 4 wherein the tubular body of the flat hollow container comprises a hollow extrudate.

6. A heat sink device for use in an electronic device according to claim 5 wherein an inner peripheral surface of each of the working liquid enclosing portions is integrally formed with a plurality of inner fins extending in the direction of extrusion.

7. A heat sink device for use in an electronic device according to claim 4 wherein the tubular body of the flat hollow container is formed of an upper component in the form of a metal plate and having an upper wall forming portion and a lower component in the form of a metal plate and having a lower wall forming portion, and each of the opposite side walls of the tubular body comprises at least one of a side wall forming portion projecting downward from each of opposite side edges of the upper component integrally therewith and brazed to the lower component and a side wall forming portion projecting upward from each of opposite side edges of the lower component integrally therewith and brazed to the upper component, each of the reinforcing walls comprising a reinforcing wall forming portion projecting inward from at least one of the upper wall forming portion of the upper component and the lower wall forming portion of the lower component integrally therewith and having a distal end brazed to the other wall forming portion.

8. A heat sink device for use in an electronic device according to claim 7 wherein the reinforcing walls are formed with communication holes for causing the parallel working liquid enclosing portions to communicate with one another.

9. A heat sink device for use in an electronic device for dissipating into the atmosphere outside a housing of the electronic device the heat generated by an electronic component disposed within the housing, the housing having a peripheral wall formed with a heat removal opening, a heat sink being disposed within the housing, the heat sink comprising a body having a heat pipe portion, and a radiation fin attached to the body in the vicinity of the heat removal opening and opposed to the opening, wherein the body comprises a flat hollow container comprising a flat upper wall, a flat lower wall and a peripheral wall interconnecting peripheral edges of the respective upper and lower walls, a working liquid being enclosed in the container to provide the heat pipe portion, and the flat hollow container comprises an upper metal plate providing the upper wall, a lower metal plate providing the lower wall, and a frame-shaped metal spacer interposed between peripheral edges of the respective upper and lower plates and joined to the upper and lower plates to provide the peripheral wall.

10. A heat sink device for use in an electronic device according to claim 9 wherein an inner fin is disposed within the flat hollow container.

11. A heat sink device for use in an electronic device for dissipating into the atmosphere outside a housing of the electronic device the heat generated by an electronic component disposed within the housing, the housing having a peripheral wall formed with a heat removal opening, a heat sink being disposed within the housing, the heat sink comprising a body having a heat pipe portion, and a radiation fin attached to the body in the vicinity of the heat removal opening and opposed to the opening, wherein the body comprises a flat hollow container comprising a flat upper wall, a flat lower wall and a peripheral wall interconnecting peripheral edges of the respective upper and lower walls, a working liquid being enclosed in the container to provide the heat pipe portion, the flat hollow container being formed of an upper component in the form of a metal plate and having an upper wall forming portion and a lower component in the form of a metal plate and having a lower wall forming portion, and the peripheral wall of the container comprises a peripheral wall forming portion formed integrally with a peripheral edge of the upper component in a downwardly protuberant shape and a peripheral wall forming portion formed integrally with a peripheral edge of the lower component in an upwardly protuberant shape, an outward flange being formed with an end of each peripheral wall forming portion, and the outward flanges of the peripheral wall forming portions being joined to each other.

12. A heat sink device for use in an electronic device for dissipating into the atmosphere outside a housing of the electronic device the heat generated by an electronic component disposed within the housing, the housing having a peripheral wall formed with an air inlet and an air outlet, a heat sink being disposed within the housing, the heat sink comprising a body in the form of a metal plate and having a heat pipe portion, the body being formed with a hole in a portion thereof other than the heat pipe portion.

13. A heat sink device for use in an electronic device according to claim 12 wherein a blower is disposed within the housing for introducing air into the housing from outside through the air inlet and discharging air from inside the housing through the air outlet.

14. A heat sink device for use in an electronic device according to claim 12 wherein the body is provided with a radiation fin at an edge portion thereof defining the hole.

15. A heat sink device for use in an electronic device according to claim 12 wherein the body has a radiation fin and the hole which are formed by slitting in a portion thereof other than the heat pipe portion.

16. A heat sink device for use in an electronic device according to claim 12 wherein the body comprises a base plate comprising a plurality of metal sheets joined to one another in superposed layers, a hollow portion being formed in a required pattern between one of the two metal sheets providing opposite surfaces of the base plate and the metal sheet adjacent to said one metal sheet, a working liquid being enclosed in the hollow portion to provide the heat pipe portion, the heat pipe portion having a heat receiving part for receiving the heat generated by the electronic component.

17. A heat sink device for use in an electronic device according to claim 11 wherein an inner fin is disposed within the flat hollow container.

* * * * *